US011310167B2

(12) United States Patent
Meng et al.

(10) Patent No.: US 11,310,167 B2
(45) Date of Patent: Apr. 19, 2022

(54) RESOURCE RESERVATION METHOD AND RELATED DEVICE

(71) Applicant: HUAWEI TECHNOLOGIES CO., LTD., Guangdong (CN)

(72) Inventors: Rui Meng, Beijing (CN); Chuang Wang, Beijing (CN); Bin Da, Beijing (CN)

(73) Assignee: Huawei Technologies Co., Ltd., Guangdong (CN)

( * ) Notice: Subject to any disclaimer, the term of this patent is extended or adjusted under 35 U.S.C. 154(b) by 47 days.

(21) Appl. No.: 16/785,181

(22) Filed: Feb. 7, 2020

(65) Prior Publication Data
US 2020/0244591 A1    Jul. 30, 2020

Related U.S. Application Data

(63) Continuation of application No. PCT/CN2018/092826, filed on Jun. 26, 2018.

(30) Foreign Application Priority Data

Aug. 8, 2017    (CN) .......................... 201710671867.3

(51) Int. Cl.
*H04L 12/913*    (2013.01)
*H04L 47/78*    (2022.01)
(Continued)

(52) U.S. Cl.
CPC .......... *H04L 47/781* (2013.01); *H04L 47/787* (2013.01); *H04L 47/821* (2013.01)

(58) Field of Classification Search
CPC .... H04L 47/781; H04L 74/787; H04L 74/821
See application file for complete search history.

(56) References Cited

U.S. PATENT DOCUMENTS 6,021,263 A * 2/2000 Kujoory ............... H04L 12/5602
370/409
2009/0013175 A1* 1/2009 Elliott ................. H04L 63/0428
713/154
(Continued)

FOREIGN PATENT DOCUMENTS

CN    101309229 A    11/2008
CN    101573915 A    11/2009
(Continued)

OTHER PUBLICATIONS

Resource ReSerVation Protocol (RSVP) Version 1 Functional Specification, RFC 2205, Sep. 1997 (retrieved from https://datatracker.ietf.org/doc/html/rfc2205#page-32) (Year: 1997).*
(Continued)

*Primary Examiner* — Brian P Cox
(74) *Attorney, Agent, or Firm* — Fish & Richardson P.C.

(57) ABSTRACT

The present disclosure relates to resource reservation methods. One example method includes receiving, by a controller, a resource reservation request that is of a communication session and that is sent by a sending device, where the resource reservation request carries resource requirement information, obtaining, by the controller based on the resource reservation request, identification information of a network device through which data transmission of the communication session to be performed between the sending device and a receiving device passes, and a resource index of the network device, sending, by the controller, the resource requirement information and the resource index to the network device based on the identification information, where the resource requirement information and the resource index are used to instruct the network device to configure a resource for the communication session, and
(Continued)

sending, by the controller, the identification information and the resource index to the sending device.

18 Claims, 8 Drawing Sheets

(51) Int. Cl.
*H04L 47/783* (2022.01)
*H04L 47/70* (2022.01)

(56) References Cited

U.S. PATENT DOCUMENTS

| | | |
|---|---|---|
| 2015/0063112 A1 | 3/2015 | Wu et al. |
| 2015/0131675 A1 | 5/2015 | Chen et al. |
| 2019/0014051 A1* | 1/2019 | Briscoe .................. H04L 47/37 |

FOREIGN PATENT DOCUMENTS

| | | | |
|---|---|---|---|
| CN | 103634203 A | 3/2014 | |
| CN | 105357068 A | 2/2016 | |
| CN | 105516025 A | 4/2016 | |
| CN | 106921594 A | 7/2017 | |
| WO | 0031929 A2 | 6/2000 | |
| WO | WO-0031929 A2 * | 6/2000 | ......... H04L 47/6215 |

OTHER PUBLICATIONS

Office Action issued in Chinese Application No. 201710671867.3 dated Feb. 20, 2021, 25 pages (with English translation).

PCT International Search Report and Written Opinion issued in International Application No. PCT/CN2018/092826 dated Sep. 11, 2018, 15 pages (with English translation).

Extended European Search Report and Written Opinion issued in European Application No. 18844895.5 dated Jun. 16, 2020, 8 pages.

Office Action issued in Chinese Application No. 201710671867.3 dated Sep. 13, 2021, 4 pages.

* cited by examiner

RESOURCE RESERVATION METHOD AND RELATED DEVICE

CROSS-REFERENCE TO RELATED APPLICATIONS

This application is a continuation of International Application No. PCT/CN2018/092826, filed on Jun. 26, 2018, which claims priority to Chinese Patent Application No. 201710671867.3, filed on Aug. 8, 2017. The disclosures of the aforementioned applications are hereby incorporated by reference in their entireties.

TECHNICAL FIELD

This application relates to the field of communications technologies, and in particular, to a resource reservation method and a related device.

BACKGROUND

The resource reservation protocol (RSVP) is a signaling protocol. The RSVP allows establishment of a path with a reserved bandwidth resource of a network device between any pair of a sending device and a receiving device on a network, to guarantee quality of service (QoS) for data transmission on the network. A QoS resource is a resource, in a network device, used for implementing bandwidth guaranteeing. Each QoS resource entity has a corresponding index.

An integrated service (IntServ) is a technology, in a network, that provides end-to-end QoS based on a flow. In a model of implementing IntServ, before sending data, the sending device needs to apply for a specific QoS resource from the network by using the RSVP, and starts to send the data only after determining that the network has reserved a QoS resource for the data. The following describes a specific procedure of the RSVP in the prior art with reference to FIG. 1 and FIG. 2. Before sending data to a receiving device R, a sending device S needs to ensure, by using the RSVP, that a resource is reserved on network devices R1, R2, R3, and R4, and maintain a mapping relationship between a to-be-sent service flow and the reserved resource on the network devices. To achieve this purpose, first, the sending device sends a path message to the receiving device by using a protocol process component. The path message carries information about requirements such as a bandwidth and a delay. During transmission of the path message, a path status is established on the network devices R1, R2, R3, and R4 hop by hop along the way, and a reverse next-hop address is obtained and saved to the path status hop by hop for guiding forwarding of a resv message, until the path message arrives at the receiving device. After receiving the path message, the receiving device returns the resv message along a path on which the path message is sent, that is, sends the resv message along the network devices R4, R3, R2, and R1. In this case, after receiving the resv message, the network device performs resource reservation by using a resource application control component of the network device. After a last-hop network device closest to the sending device receives the resv message and succeeds in reserving a resource, it is considered that QoS resource reservation on the entire path succeeds. In this case, the last-hop network device may send a confirmation message (namely, a conf message) to the receiving device along a path on which the resv message is sent. After receiving the confirmation message, the receiving device learns that QoS resource reservation on the entire path succeeds. After the reservation succeeds, a service flow matching table is established in a traffic classifier of the network device, and a corresponding QoS resource is delivered and a corresponding resource index is obtained in a traffic scheduler of the network device. If any-hop network device fails to reserve a resource, the network device sends a resverr message (namely, an err message) to the receiving device along the path on which the resv message is sent. Each network device that receives the resverr message releases a reserved QoS resource. After the resource reservation succeeds, when sending the data, the sending device may obtain, on the network devices, resource indexes by using traffic classifiers, and the traffic classifiers of the network devices obtain reserved resources according to the resource indexes to perform QoS-guaranteed scheduling and hop-by-hop forwarding.

Although the IntServ can meet a QoS requirement satisfactorily, reserved resource application of the RSVP is performed in series. First, the path status is established by using the path message, and then a resource is reserved only when the resv message is returned. In a case of a failure, the resverr message is required for releasing the reserved QoS resource. In addition, all the network devices used in the resource reservation by using the RSVP must support the RSVP. For each network device on the transmission path of the path message, a resource needs to be consumed to maintain a control plane context for reverse forwarding of the resv message. In other words, the RSVP requires establishment of the service flow matching table on each network device along the transmission path of the path message, to implement mapping between a service flow and a resource. Therefore, a large amount of resources of the network devices need to be consumed, for example, a resource occupied by the context.

SUMMARY

To resolve a prior-art technical problem of high resource consumption of a network device, embodiments of this application provide a resource reservation method. According to the method, a controller may obtain identification information and a resource index that are of a network device through which data transmission of a communication session to be performed between a sending device and a receiving device passes; send the resource index and resource requirement information to the network device based on the identification information, so that the network device configures a resource based on the resource index and the resource requirement information; and send the identification information and the resource index to the sending device, so that the sending device adds the identification information and the resource index to data of the communication session, and sends the data to the receiving device through the network device. Therefore, resources of an entire network are managed by the controller, and resources are applied for only from the controller, without consuming resources of the network device that are used for establishing a mapping relationship between a service flow and a resource. The embodiments of this application further provide related devices such as a resource reservation apparatus, a controller, a sending device, a network device, a computer program product, and a computer storage medium.

A first aspect of the embodiments of this application provides a resource reservation method. The method may include: A controller receives a resource reservation request that is of a communication session and that is sent by a sending device, where the resource reservation request may be sent by the sending device to the controller when the communication session has a guaranteed-QoS communication requirement. The resource reservation request may carry information such as resource requirement information and a quintuple. After receiving the resource reservation request, the controller may obtain, based on the information carried in the resource reservation request, identification information of a network device through which data transmission of the communication session to be performed between the sending device and a receiving device passes, and obtain a resource index of the network device. The identification information may be an address of the network device, or may be related information used for identifying the network device. The controller sends the resource requirement information and the resource index to the network device based on the identification information, where the resource requirement information and the resource index are used to instruct the network device to configure a resource for the communication session, so that the network device configures a corresponding resource for the communication session based on the received resource requirement information and resource index. It can be understood that when there is only one network device, the controller only needs to send, to the network device, resource requirement information and a resource index that are corresponding to the network device, and when there are a plurality of network devices, the controller needs to send, to a corresponding network device, resource requirement information and a resource index that are corresponding to the network device. After sending the resource requirement information and the resource index to the network device, the controller sends the identification information of the network device and the resource index of the network device to the sending device. For example, when receiving a response message fed back by the network device after the network device completes resource configuration, the controller may send the identification information of the network device and the resource index of the network device to the sending device. Alternatively, the controller may send the identification information of the network device and the resource index of the network device to the sending device in a preset time after sending the resource requirement information and the resource index to the network device. With the preset time, it can be ensured that the network device has completed resource configuration. The preset time may be flexibly set based on an actual requirement. This is not specifically limited herein. In this way, during sending of data of the communication session, the sending device may send the identification information of the network device and the resource index of the network device to the receiving device along with the data through the network device, so that the network device can schedule the corresponding resource based on the identification information and the resource index to forward the data. In this case, resources of an entire network are managed by the controller, network devices no longer maintain, by using the RSVP on the entire network, a service flow status or perform operations such as forwarding a path message and a resv message to apply for resources in series. Instead, resources are applied for in parallel only from the controller, with no need to consume resources of the network devices to establish a mapping relationship between a service flow and a resource, thereby saving resource overheads of the network devices.

With reference to the first aspect of the embodiments of this application, in a first implementation of the first aspect of the embodiments of this application, a time at which the controller sends the identification information of the network device and the resource index of the network device to the sending device may be after the controller receives the response message fed back by the network device. When determining, based on the response message, that the network device has completed resource configuration, the controller sends the identification information of the network device and the resource index of the network device to the sending device. The response message is fed back to the controller by the network device after the network device completes resource reservation based on the resource requirement information and the resource index. The response message is used to indicate that the network device has completed resource configuration. A type of the response message may be flexibly set depending on an actual requirement, and is not specifically limited herein. In this embodiment, the controller may send the identification information of the network device and the resource index of the network device to the sending device after receiving the response message, thereby ensuring that the identification information and the resource index are sent to the sending device after resource configuration is completed, and improving reliability in sending, by the controller, the identification information and the resource index to the sending device.

With reference to the first aspect of the embodiments of this application or the first implementation of the first aspect of the embodiments of this application, in a second implementation of the first aspect of the embodiments of this application, the resource reservation request received by the controller carries not only at least one piece of the resource requirement information such as a bandwidth resource, a maximum delay, and a packet loss rate, but also the quintuple, for example, a destination address corresponding to the receiving device, a source address corresponding to the sending device, a source port number, a destination port, and a protocol number. When obtaining the identification information and the resource index that are of the network device, the controller may obtain, based on the resource requirement information and the destination address that are carried in the resource reservation request, the identification information of the network device through which the data transmission of the communication session to be performed between the sending device and the receiving device passes, and the resource index of the network device. This improves convenience and reliability in obtaining the identification information and the resource index that are of the network device.

With reference to the second implementation of the first aspect of the embodiments of this application, in a third implementation of the first aspect of the embodiments of this application, the controller maintains resources of all network devices in an entire network, and when obtaining the identification information and the resource index that are of the network device, the controller may obtain, by accessing the resources of all the network devices maintained by the controller, an idle resource of the network device through which the data transmission of the communication session to be performed between the sending device and the receiving device passes, where the idle resource may include an idle resource index, an idle bandwidth resource, and the like, and the idle resource can meet a requirement of a resource corresponding to the resource index and the resource requirement information. Then, the controller obtains, based on the resource requirement information, the destination address, and the idle resource, the identification information of the network device through which the data transmission of the communication session to be performed between the sending device and the receiving device passes, and the controller allocates the resource index to the communication session. In this embodiment, the controller manages the resources of the entire network, thereby implementing that resources are applied for in parallel only from the controller, and improving flexibility and efficiency of resource application.

With reference to the third implementation of the first aspect of the embodiments of this application, in a fourth implementation of the first aspect of the embodiments of this application, when obtaining the identification information of the network device through which the data transmission of the communication session to be performed between the sending device and the receiving device passes, the controller may first obtain, from the entire network maintained by the controller, a path that meets the resource requirement information, the destination address, and the idle resource, and then obtain, from the path, a shortest path that is to be taken for the data transmission to be performed between the sending device and the receiving device. For example, when there is only one path that meets the resource requirement information, the destination address, and the idle resource, the path is the shortest path, and when there are a plurality of paths that meet the resource requirement information, the destination address, and the idle resource, a shortest one of the paths is selected. The controller may calculate the shortest path by running a shortest path first (English full name: constrained shortest path first, English abbreviation: CSPF) algorithm, or may obtain the shortest path by running another algorithm. This is not specifically limited herein. After obtaining the shortest path, the controller determines a corresponding network device on the shortest path, and obtains identification information of the network device. In this embodiment, the controller can obtain the identification information of the network device on the shortest path that is to be taken for the data transmission of the communication session to be performed between the sending device and the receiving device. Therefore, the data transmission of the communication session passes a relatively small quantity of network devices, thereby improving transmission efficiency of the data of the communication session.

With reference to any one of the first aspect or the first to the fourth implementations of the first aspect of the embodiments of this application, in a fifth implementation of the first aspect of the embodiments of this application, to facilitate sending of the identification information and the resource index, in a process in which the controller sends the identification information and the resource index that are of the network device to the sending device, the controller may add the identification information and the resource index that are of the network device to a signaling packet, and then send the signaling packet that carries the identification information and the resource index to the sending device. A type of the signaling packet is not specifically limited herein. Implementation is quite easy, and this improves convenience in sending the identification information and the resource index.

With reference to any one of the first aspect or the first to the fifth implementations of the first aspect of the embodiments of this application, in a sixth implementation of the first aspect of the embodiments of this application, the resource index includes a leaky bucket index or a queue index. In other words, during resource scheduling, if a traffic flow rate is controlled through traffic policing, for example, through traffic policing implemented by using a leaky bucket algorithm, in this case, a QoS resource is corresponding to a leaky bucket resource, and a QoS resource index is corresponding to a leaky bucket index. During resource scheduling, if a traffic flow rate is controlled through traffic shaping, for example, through traffic policing implemented by using a queue algorithm, in this case, a QoS resource is corresponding to a queue resource, and a QoS resource index is corresponding to a queue index. In this embodiment, a type of the resource index may be set based on a resource type, thereby enriching the type of the resource index and implementing diversity of the resource index.

With reference to any one of the first aspect or the first to the sixth implementations of the first aspect of the embodiments of this application, in a seventh implementation of the first aspect of the embodiments of this application, the resource requirement information includes at least one of a bandwidth resource, a burst size, a maximum delay, a maximum delay variation, a packet loss rate, and the like, and depending on an actual requirement, the resource requirement information may further include other information. This is not specifically limited herein. In this embodiment, the resource requirement information may include a variety of information, thereby avoiding unicity of the resource requirement information and implementing diversity of the resource requirement information.

A second aspect of the embodiments of this application provides a resource reservation method. The method may include: A sending device sends a resource reservation request of a communication session to a controller, so that the controller obtains, based on the resource reservation request, identification information of a network device through which data transmission of the communication session to be performed between the sending device and a receiving device passes, and a resource index of the network device, and sends resource requirement information and the resource index to the network device based on the identification information. In this way, the network device configures a corresponding resource for the communication session based on the received resource requirement information and resource index. The resource reservation request may be sent by the sending device to the controller when the communication session has a guaranteed-QoS communication requirement. The resource reservation request may carry information such as the resource requirement information and a quintuple. The resource requirement information may include a bandwidth resource, a maximum delay, a packet loss rate, and the like. The quintuple may include a destination address, a source address, a source port number, a destination port, a protocol number, and the like. The sending device receives feedback information that is fed back by the controller based on the resource reservation request, where the feedback information carries the identification information of the network device through which the data transmission of the communication session passes, and the resource index of the network device, the identification information may be an address of the network device, or may be related information used for identifying the network device, and the resource index may be a leaky bucket index or a queue index. When data of the communication session needs to be sent, the sending device adds the identification information and the resource index that are of the network device to the data of the communication session, and sends, to the receiving device through the network device, the data that carries the identification information and the resource index, so that the network device can schedule the corresponding resource based on the identification information and the resource index to forward the data. In this case, resources of an entire network are managed by the controller, network devices no longer maintain, by using the RSVP on the entire network, a service flow status or perform operations such as forwarding a path message and a resv message to apply for resources in series. Instead, resources are applied for in parallel only from the controller, with no need to consume resources of the network devices to establish a mapping relationship between a service flow and a resource, thereby saving resource overheads of the network devices. In addition, during sending of the data of the communication session, the sending device adds the identification information and the resource index that are of the network device to the data of the communication session, and sends the data to the receiving device through the network device, so that the network device can schedule the corresponding resource based on the identification information and the resource index to forward the data. Implementation is quite easy.

With reference to the second aspect of the embodiments of this application, in a first implementation of the second aspect of the embodiments of this application, to facilitate adding of the identification information and the resource index to the data of the communication session by the sending device during sending of the data of the communication session, after receiving the identification information and the resource index that are of the network device and that are sent by the controller, the sending device first obtains a session identifier of the communication session, and then stores the identification information and the resource index after associating the identification information and the resource index with the session identifier. The sending device may store the identification information and the resource index in the sending device or in a server. This is not specifically limited herein. During sending of the data of the communication session, the sending device may obtain, from the sending device, the server, or the like, the stored identification information and resource index that are corresponding to the session identifier, then adds the stored identification information and resource index that are obtained to the data, and sends the data to the receiving device through the network device. In this embodiment, the sending device may store the identification information and the resource index after associating the identification information and the resource index with the session identifier, thereby facilitating subsequent use of the identification information and the resource index and improving convenience in sending data by the sending device.

With reference to the second aspect of the embodiments of this application or the first implementation of the second aspect of the embodiments of this application, in a second implementation of the second aspect of the embodiments of this application, the data sent by the sending device to the receiving device through the network device may be a data packet, or may be data of another type. A type of the data may include internet protocol version 6 (English full name: internet protocol version 6, English abbreviation: IPv6), internet protocol version 4 (English full name: internet protocol version 4, English abbreviation: IPv4), multiprotocol label switching (English full name: multi-protocol label switching, English abbreviation: MPLS), or the like. It can be understood that the type of the data may further include another type. This is not specifically limited herein. In this embodiment, diversity of the type of the data is implemented.

With reference to the second implementation of the second aspect of the embodiments of this application, in a third implementation of the second aspect of the embodiments of this application, when the type of the data of the communication session is IPv6, during sending of the data of the communication session, the sending device may add the identification information and the resource index to an IPv6 header and send the IPv6 to the receiving device through the network device. For example, a field for extending the IPv6 header may be used, and the identification information and the resource index are added to the IPv6 extension field. When the type of the data of the communication session is IPv4, during sending of the data of the communication session, the sending device may add the identification information and the resource index to an IPv4 header and send the IPv4 to the receiving device through the network device. When the type of the data of the communication session is MPLS, during sending of the data of the communication session, the sending device may add the identification information and the resource index to an MPLS header and send the MPLS to the receiving device through the network device. In this embodiment, implementation is quite easy, and flexibility in sending data by the sending device is also improved.

A third aspect of the embodiments of this application provides a resource reservation method. The method may include: A network device receives resource requirement information of a communication session and a resource index that are sent by a controller, where the resource requirement information and the resource index may be sent by the controller after the controller obtains, based on a received resource reservation request that is of the communication session and that is sent by a sending device, identification information of the network device through which data transmission of the communication session to be performed between the sending device and a receiving device passes, and the resource index of the network device. The resource reservation request may be sent by the sending device to the controller when the communication session has a guaranteed-QoS communication requirement. The resource reservation request may carry the resource requirement information such as a bandwidth resource, a burst size, a maximum delay, a maximum delay variation, and a packet loss rate, and information such as a destination address corresponding to the receiving device, a source address corresponding to the sending device, a source port number, a destination port, and a protocol number. The network device configures a resource for the communication session based on the resource requirement information and the resource index, where the resource is corresponding to the resource index, and the resource index may be a leaky bucket index, a queue index, or the like. When the sending device sends data of the communication session, the network device receives the data that is of the communication session and that is sent by the sending device, where the data carries a target resource index corresponding to the network device and target identification information corresponding to a next hop relative to the network device, the target resource index is included in the resource index, and the target identification information is included in the identification information of the network device through which data transmission passes. The network device forwards the data based on the target resource index and the target identification information. For example, the network device may determine an output interface corresponding to the target identification information, and obtain a resource corresponding to the target resource index, and then send the data to the next hop relative to the network device by using the output interface and the resource, until a next hop is the receiving device. In this embodiment of this application, resources of an entire network are managed by the controller, network devices no longer maintain, by using the RSVP on the entire network, a service flow status or perform operations such as forwarding a path message and a resv message to apply for resources in series. Instead, resources are applied for in parallel only from the controller, with no need to consume resources of the network devices to establish a mapping relationship between a service flow and a resource, thereby saving resource overheads of the network devices.

With reference to the third aspect of the embodiments of this application, in a first implementation of the third aspect of the embodiments of this application, to ensure that the controller can send the identification information of the network device and the resource index of the network device to the sending device when resource configuration is completed, the network device feeds back a response message to the controller after completing configuration of the resource for the communication session based on the received resource requirement information and resource index that are sent by the controller. In this way, the controller determines, based on the response message, that the network device has completed resource configuration, and then sends the identification information of the network device and the resource index of the network device to the sending device. A type of the response message may be flexibly set depending on an actual requirement, and is not specifically limited herein. In this embodiment, the network device feeds back the response message to the controller after completing resource configuration, thereby ensuring that the controller can send the identification information of the network device and the resource index of the network device to the sending device when resource configuration is completed, and improving reliability in sending, by the controller, the identification information and the resource index to the sending device.

With reference to the third aspect of the embodiments of this application or the first implementation of the third aspect of the embodiments of this application, in a second implementation of the third aspect of the embodiments of this application, in a process in which the network device forwards the data of the communication session based on the target resource index and the target identification information, the network device first obtains, from the first instruction section of the data, the target resource index corresponding to the network device and the target identification information corresponding to the next hop relative to the network device. Then, the network device obtains an output interface corresponding to the target identification information, and deletes the target identification information after obtaining the output interface. The network device obtains, from a traffic scheduler pre-configured in the network device, a resource corresponding to the target resource index, schedules the resource, and deletes the target resource index after obtaining the resource. The network device sends the data of the communication session to the next hop relative to the network device by using the output interface and the resource, until a next hop is the receiving device. In this embodiment, the network device may forward the data based on identification information and resource indexes that are sequentially stored in the data and that are corresponding to all network devices through which the data transmission of the communication session to be performed between the sending device and the receiving device passes. When forwarding the data, the network device obtains the target identification information and the target resource index that are stored in the first instruction section, and deletes the target identification information and the target resource index after using the target identification information and the target resource index. When the data is transmitted to a next-hop network device, the next-top network device also obtains target identification information and a target resource index that are stored in the first instruction section, and deletes the target identification information and the target resource index after using the target identification information and the target resource index, until a next hop is the receiving device, thereby improving efficiency and convenience of data transmission.

With reference to the third aspect of the embodiments of this application or the first implementation of the third aspect of the embodiments of this application, in a third implementation of the third aspect of the embodiments of this application, in a process in which the network device forwards the data of the communication session based on the target resource index and the target identification information, the network device first obtains, from the data of the communication session based on an offset corresponding to the network device among all network devices through which the data transmission of the communication session to be performed between the sending device and the receiving device passes, the target resource index corresponding to the network device and the target identification information corresponding to the next hop relative to the network device. Then, the network device obtains an output interface corresponding to the target identification information, and obtains, from a traffic scheduler pre-configured in the network device, a resource corresponding to the target resource index, and schedules the resource. The network device sends the data of the communication session to the next hop by using the output interface and the resource, until a next hop is the receiving device. In this embodiment, the network device may forward the data based on identification information and resource indexes that are sequentially stored in the data and that are corresponding to all network devices through which the data transmission of the communication session to be performed between the sending device and the receiving device passes. When forwarding the data, the network device may obtain, from the data based on the offset corresponding to the network device, the corresponding target resource index and the corresponding target identification information for forwarding the data, thereby improving flexibility, namely, reliability, in forwarding the data.

With reference to any one of the third aspect of the embodiments of this application or the first to the third implementations of the third aspect of the embodiments of this application, in a fourth implementation of the third aspect of the embodiments of this application, the resource index includes a leaky bucket index or a queue index. In other words, during resource scheduling, if a traffic flow rate is controlled through traffic policing, for example, through traffic policing implemented by using a leaky bucket algorithm, in this case, a QoS resource is corresponding to a leaky bucket resource, and a QoS resource index is corresponding to a leaky bucket index; or during resource scheduling, if a traffic flow rate is controlled through traffic shaping, for example, through traffic policing implemented by using a queue algorithm, in this case, a QoS resource is corresponding to a queue resource, and a QoS resource index is corresponding to a queue index. In this embodiment, a type of the resource index may be set based on a resource type, thereby enriching the type of the resource index and implementing diversity of the resource index.

With reference to any one of the third aspect of the embodiments of this application or the first to the fourth implementations of the third aspect of the embodiments of this application, in a fifth implementation of the third aspect of the embodiments of this application, the resource requirement information includes at least one of a bandwidth resource, a burst size, a maximum delay, a maximum delay variation, and a packet loss rate. Depending on an actual requirement, the resource requirement information may further include other information. This is not specifically limited herein. In this embodiment, the resource requirement information may include a variety of information, thereby avoiding unicity of the resource requirement information and implementing diversity of the resource requirement information.

A fourth aspect of the embodiments of this application provides a resource reservation apparatus. The apparatus may include: a receiving unit, configured to receive a resource reservation request that is of a communication session and that is sent by a sending device, where the resource reservation request may be sent by the sending device when the communication session has a guaranteed-QoS communication requirement, and the resource reservation request carries information such as resource requirement information and a quintuple; an obtaining unit, configured to obtain, based on the resource reservation request received by the receiving unit, identification information of a network device through which data transmission of the communication session to be performed between the sending device and a receiving device passes, and a resource index of the network device, where the identification information may be an address of the network device, or may be related information used for identifying the network device; a first sending unit, configured to send, to the network device based on the identification information obtained by the obtaining unit, the resource requirement information received by the receiving unit and the resource index obtained by the obtaining unit, where the resource requirement information and the resource index are used to instruct the network device to configure a resource for the communication session, so that the network device configures a corresponding resource for the communication session based on the received resource requirement information and resource index, and it can be understood that when there is only one network device, the first sending unit merely needs to send, to the network device, resource requirement information and a resource index that are corresponding to the network device, and when there are a plurality of network devices, the first sending unit needs to send, to a corresponding network device, resource requirement information and a resource index that are corresponding to the network device; and a second sending unit, configured to send, to the sending device, the identification information and the resource index that are obtained by the obtaining unit. For example, when receiving a response message fed back by the network device after the network device completes resource configuration, the second sending unit may send the identification information of the network device and the resource index of the network device to the sending device. Alternatively, the second sending unit may send the identification information of the network device and the resource index of the network device to the sending device in a preset time after sending the resource requirement information and the resource index to the network device. With the preset time, it can be ensured that the network device has completed resource configuration. The preset time may be flexibly set based on an actual requirement. This is not specifically limited herein. In this way, during sending of data of the communication session, the sending device may send the identification information of the network device and the resource index of the network device to the receiving device along with the data through the network device, so that the network device can schedule the corresponding resource based on the identification information and the resource index to forward the data. In this case, resources of an entire network are managed, for a controller, by the receiving unit, the obtaining unit, the first sending unit, the second sending unit, and the like, network devices no longer maintain, by using the RSVP on the entire network, a service flow status or perform operations such as forwarding a path message and a resv message to apply for resources in series. Instead, resources are applied for in parallel only from the controller, with no need to consume resources of the network devices to establish a mapping relationship between a service flow and a resource, thereby saving resource overheads of the network devices.

With reference to the fourth aspect of the embodiments of this application, in a first implementation of the fourth aspect of the embodiments of this application, the second sending unit is specifically configured to: receive a response message that is fed back by the network device after the network device completes resource reservation based on the resource requirement information and the resource index; and send, to the sending device based on the response message, the identification information and the resource index that are obtained by the obtaining unit. In this embodiment, a time at which the second sending unit sends the identification information of the network device and the resource index of the network device to the sending device may be after the second sending unit receives the response message, thereby ensuring that the identification information and the resource index are sent to the sending device after resource configuration is completed, and improving reliability in sending, by the second sending unit, the identification information and the resource index to the sending device.

With reference to the fourth aspect of the embodiments of this application or the first implementation of the fourth aspect of the embodiments of this application, in a second implementation of the fourth aspect of the embodiments of this application, the resource reservation request received by the receiving unit carries not only at least one piece of the resource requirement information such as a bandwidth resource, a maximum delay, and a packet loss rate, but also the quintuple, for example, a destination address corresponding to the receiving device, a source address corresponding to the sending device, a source port number, a destination port, and a protocol number, and the obtaining unit is specifically configured to obtain, based on the resource requirement information and the destination address that are carried in the resource reservation request received by the receiving unit, the identification information and the resource index that are of the network device through which the data transmission of the communication session to be performed between the sending device and the receiving device passes. This improves convenience and reliability in obtaining the identification information and the resource index that are of the network device.

With reference to the second implementation of the fourth aspect of the embodiments of this application, in a third implementation of the fourth aspect of the embodiments of this application, the obtaining unit includes: a first obtaining subunit, configured to obtain, by accessing resources of all network devices maintained by the controller, an idle resource of the network device through which the data transmission of the communication session to be performed between the sending device and the receiving device passes, where the idle resource may include an idle resource index, an idle bandwidth resource, and the like, and the idle resource can meet a requirement of a resource corresponding to the resource index and the resource requirement information; a second obtaining subunit, configured to obtain, based on the resource requirement information received by the receiving unit, the destination address received by the receiving unit, and the idle resource obtained by the first obtaining subunit, the identification information of the network device through which the data transmission of the communication session to be performed between the sending device and the receiving device passes; and an allocation subunit, configured to allocate the resource index to the communication session. In this embodiment, resources are applied for in parallel in a centralized manner, and flexibility and efficiency of resource application are improved.

With reference to the third implementation of the fourth aspect of the embodiments of this application, in a fourth implementation of the fourth aspect of the embodiments of this application, the second obtaining subunit is specifically configured to: obtain, from a network, a path that meets the resource requirement information, the destination address, and the idle resource; obtain, from the path, a shortest path that is to be taken for the data transmission to be performed between the sending device and the receiving device; and determine the identification information based on the shortest path. For example, when there is only one path that meets the resource requirement information, the destination address, and the idle resource, the path is the shortest path; and when there are a plurality of paths that meet the resource requirement information, the destination address, and the idle resource, a shortest one of the paths is selected. The second obtaining subunit may calculate the shortest path by running a CSPF algorithm, or may obtain the shortest path by running another algorithm. This is not specifically limited herein. After obtaining the shortest path, the second obtaining subunit determines a corresponding network device on the shortest path, and obtains identification information of the network device. In this embodiment, the second obtaining subunit can obtain the identification information of the network device on the shortest path that is to be taken for the data transmission of the communication session to be performed between the sending device and the receiving device. Therefore, the data transmission of the communication session passes a relatively small quantity of network devices, thereby improving transmission efficiency of the data of the communication session.

With reference to any one of the fourth aspect of the embodiments of this application or the first to the fourth implementations of the fourth aspect of the embodiments of this application, in a fifth implementation of the fourth aspect of the embodiments of this application, to facilitate sending of the identification information and the resource index, in a process in which the second sending unit sends the identification information and the resource index that are of the network device to the sending device, the second sending unit is specifically configured to: add, to a signaling packet, the identification information and the resource index that are obtained by the obtaining unit; and send the signaling packet that carries the identification information and the resource index to the sending device, where a type of the signaling packet is not specifically limited herein. Implementation is quite easy, and this improves convenience in sending the identification information and the resource index.

With reference to any one of the fourth aspect of the embodiments of this application or the first to the fifth implementations of the fourth aspect of the embodiments of this application, in a sixth implementation of the fourth aspect of the embodiments of this application, the resource index includes a leaky bucket index or a queue index. In other words, during resource scheduling, if a traffic flow rate is controlled through traffic policing, for example, through traffic policing implemented by using a leaky bucket algorithm, in this case, a QoS resource is corresponding to a leaky bucket resource, and a QoS resource index is corresponding to a leaky bucket index; or during resource scheduling, if a traffic flow rate is controlled through traffic shaping, for example, through traffic policing implemented by using a queue algorithm, in this case, a QoS resource is corresponding to a queue resource, and a QoS resource index is corresponding to a queue index. In this embodiment, a type of the resource index may be set based on a resource type, thereby enriching the type of the resource index and implementing diversity of the resource index.

With reference to any one of the fourth aspect of the embodiments of this application or the first to the sixth implementations of the fourth aspect of the embodiments of this application, in a seventh implementation of the fourth aspect of the embodiments of this application, the resource requirement information includes at least one of a bandwidth resource, a burst size, a maximum delay, a maximum delay variation, a packet loss rate, and the like, and depending on an actual requirement, the resource requirement information may further include other information. This is not specifically limited herein. In this embodiment, the resource requirement information may include a variety of information, thereby avoiding unicity of the resource requirement information and implementing diversity of the resource requirement information.

A fifth aspect of the embodiments of this application provides a resource reservation apparatus. The apparatus may include: a first sending unit, configured to send a resource reservation request of a communication session to a controller, so that the controller obtains, based on the resource reservation request, identification information of a network device through which data transmission of the communication session to be performed between the sending device and a receiving device passes, and a resource index of the network device, and sends resource requirement information and the resource index to the network device based on the identification information, so that the network device configures a corresponding resource for the communication session based on the received resource requirement information and resource index, where the resource reservation request may be sent by the sending device to the controller when the communication session has a guaranteed-QoS communication requirement, the resource reservation request may carry information such as the resource requirement information and a quintuple, the resource requirement information may include a bandwidth resource, a maximum delay, a packet loss rate, and the like, and the quintuple may include a destination address, a source address, a source port number, a destination port, a protocol number, and the like; a receiving unit, configured to receive feedback information that is fed back by the controller based on the resource reservation request sent by the first sending unit, where the feedback information carries the identification information of the network device through which the data transmission of the communication session passes, and the resource index of the network device, the identification information may be an address of the network device, or may be related information used for identifying the network device, and the resource index may be a leaky bucket index or a queue index; and a second sending unit, configured to: add, to data of the communication session, the identification information and the resource index that are received by the receiving unit, and send, to the receiving device through the network device, the data that carries the identification information and the resource index, so that the network device can schedule the corresponding resource based on the identification information and the resource index to forward the data. In this case, resources of an entire network are managed by the controller, network devices no longer maintain, by using the RSVP on the entire network, a service flow status or perform operations such as forwarding a path message and a resv message to apply for resources in series. Instead, resources are applied for in parallel only from the controller, with no need to consume resources of the network devices to establish a mapping relationship between a service flow and a resource, thereby saving resource overheads of the network devices. In addition, during sending of the data of the communication session, the second sending unit adds the identification information and the resource index that are of the network device to the data of the communication session, and sends the data to the receiving device through the network device, so that the network device can schedule the corresponding resource based on the identification information and the resource index to forward the data. Implementation is quite easy.

With reference to the fifth aspect of the embodiments of this application, in a first implementation of the fifth aspect of the embodiments of this application, to facilitate adding of the identification information and the resource index to the data of the communication session by the second sending unit during sending of the data of the communication session, the resource reservation apparatus further includes: an obtaining unit, configured to obtain a session identifier of the communication session; and a storage unit, configured to: store the identification information received by the receiving unit and the resource index received by the receiving unit after associating the identification information and the resource index with the session identifier obtained by the obtaining unit, where the storage unit may store the identification information and the resource index in the sending device or in a server, and this is not specifically limited herein. The second sending unit is specifically configured to: obtain the stored identification information and resource index based on the session identifier obtained by the obtaining unit, add the identification information and the resource index to the data, and send the data to the receiving device through the network device. In this embodiment, the storage unit may store the identification information and the resource index after associating the identification information and the resource index with the session identifier, thereby facilitating subsequent use of the identification information and the resource index and improving convenience in sending data.

With reference to the fifth aspect of the embodiments of this application or the first implementation of the fifth aspect of the embodiments of this application, in a second implementation of the fifth aspect of the embodiments of this application, the data sent by the second sending unit to the receiving device through the network device may be a data packet, or may be data of another type. A type of the data includes internet protocol version 6 IPv6, internet protocol version 4 IPv4, multiprotocol label switching MPLS, or the like. It can be understood that the type of the data may further include another type. This is not specifically limited herein. In this embodiment, diversity of the type of the data is implemented.

With reference to the second implementation of the fifth aspect of the embodiments of this application, in a third implementation of the fifth aspect of the embodiments of this application, when the type of the data of the communication session is IPv6, during sending of the data of the communication session, the second sending unit may add the identification information and the resource index to an IPv6 header and send the IPv6 to the receiving device through the network device. For example, a field for extending the IPv6 header may be used, and the identification information and the resource index are added to the IPv6 extension field. When the type of the data of the communication session is IPv4, during sending of the data of the communication session, the second sending unit may add the identification information and the resource index to an IPv4 header, and send the IPv4 to the receiving device through the network device. When the type of the data of the communication session is MPLS, during sending of the data of the communication session, the second sending unit may add the identification information and the resource index to an MPLS header and send the MPLS to the receiving device through the network device. In this embodiment, implementation is quite easy, and flexibility in sending data by the sending device is also improved.

A sixth aspect of the embodiments of this application provides a resource reservation apparatus. The apparatus may include: a first receiving unit, configured to receive resource requirement information of a communication session and a resource index that are sent by a controller, where the resource requirement information and the resource index may be sent by the controller after the controller obtains, based on a received resource reservation request that is of the communication session and that is sent by a sending device, identification information of a network device through which data transmission of the communication session to be performed between the sending device and a receiving device passes, and the resource index of the network device, the resource reservation request may be sent by the sending device to the controller when the communication session has a guaranteed-QoS communication requirement, and the resource reservation request may carry the resource requirement information such as a bandwidth resource, a burst size, a maximum delay, a maximum delay variation, and a packet loss rate, and information such as a destination address corresponding to the receiving device, a source address corresponding to the sending device, a source port number, a destination port, and a protocol number; a configuration unit, configured to configure a resource for the communication session based on the resource requirement information and the resource index that are received by the first receiving unit, where the resource is corresponding to the resource index, and the resource index may be a leaky bucket index, a queue index, or the like; a second receiving unit, configured to receive data that is of the communication session and that is sent by the sending device, where the data carries a target resource index corresponding to the network device and target identification information corresponding to a next hop relative to the network device, the network device is a network device in which the resource reservation apparatus is located, the target resource index is included in the resource index, and the target identification information is included in the identification information of the network device through which the data transmission passes; and a forwarding unit, configured to forward, based on the target resource index and the target identification information that are received by the second receiving unit, the data received by the second receiving unit. For example, the forwarding unit may determine an output interface corresponding to the target identification information, and obtain a resource corresponding to the target resource index, and then send the data to the next hop relative to the network device by using the output interface and the resource, until a next hop is the receiving device. In this embodiment of this application, resources of an entire network are managed by the controller, network devices no longer maintain, by using the RSVP on the entire network, a service flow status or perform operations such as forwarding a path message and a resv message to apply for resources in series. Instead, resources are applied for in parallel only from the controller, with no need to consume resources of the network devices to establish a mapping relationship between a service flow and a resource, thereby saving resource overheads of the network devices.

With reference to the sixth aspect of the embodiments of this application, in a first implementation of the sixth aspect of the embodiments of this application, to ensure that the controller can send the identification information of the network device and the resource index of the network device to the sending device when resource configuration is completed, the resource reservation apparatus further includes a feedback unit, configured to feed back a response message to the controller after the configuration unit completes configuring the resource. In this way, the controller determines, based on the response message, that the configuration unit has completed resource configuration, and then sends the identification information of the network device and the resource index of the network device to the sending device. A type of the response message may be flexibly set depending on an actual requirement, and is not specifically limited herein. In this embodiment, the configuration unit feeds back the response message to the controller after the configuration unit completes resource configuration, thereby ensuring that the controller can send the identification information of the network device and the resource index of the network device to the sending device when resource configuration is completed, and improving reliability in sending, by the controller, the identification information and the resource index to the sending device.

With reference to the sixth aspect of the embodiments of this application or the first implementation of the sixth aspect of the embodiments of this application, in a second implementation of the sixth aspect of the embodiments of this application, in a process in which the forwarding unit forwards the data of the communication session based on the target resource index and the target identification information, the forwarding unit is specifically configured to: obtain, from the first instruction section of the data received by the second receiving unit, the target resource index corresponding to the network device and the target identification information corresponding to the next hop relative to the network device; obtain an output interface corresponding to the target identification information; delete the target identification information after obtaining the output interface; obtain, from a traffic scheduler pre-configured in the network device, a resource corresponding to the target resource index, schedule the resource, and delete the target resource index after obtaining the resource; and send the data of the communication session to the next hop relative to the network device by using the output interface and the resource, until a next hop is the receiving device. In this embodiment, the forwarding unit may forward the data based on identification information and resource indexes that are sequentially stored in the data and that are corresponding to all network devices through which the data transmission of the communication session to be performed between the sending device and the receiving device passes. When forwarding the data, the forwarding unit obtains the target identification information and the target resource index that are stored in the first instruction section, and deletes the target identification information and the target resource index after using the target identification information and the target resource index. When the data is transmitted to a next-hop network device, the next-top network device also obtains target identification information and a target resource index that are stored in the first instruction section, and deletes the target identification information and the target resource index after using the target identification information and the target resource index, until a next hop is the receiving device, thereby improving efficiency and convenience of data transmission.

With reference to the sixth aspect of the embodiments of this application or the first implementation of the sixth aspect of the embodiments of this application, in a third implementation of the sixth aspect of the embodiments of this application, in a process in which the forwarding unit forwards the data of the communication session based on the target resource index and the target identification information, the forwarding unit is specifically configured to: obtain, from the data received by the second receiving unit and based on an offset corresponding to the network device, among all network devices through which the data transmission of the communication session to be performed between the sending device and the receiving device passes, in which the forwarding unit is located, the target resource index corresponding to the network device and the target identification information corresponding to the next hop relative to the network device; then obtain an output interface corresponding to the target identification information; obtain, from a traffic scheduler pre-configured in the network device, a resource corresponding to the target resource index, and schedule the resource; and send the data of the communication session to the next hop relative to the network device by using the output interface and the resource, until a next hop is the receiving device. In this embodiment, the forwarding unit may forward the data based on identification information and resource indexes that are sequentially stored in the data and that are corresponding to all network devices through which the data transmission of the communication session to be performed between the sending device and the receiving device passes. When forwarding the data, the forwarding unit may obtain, from the data based on the offset corresponding to the network device in which the forwarding unit is located, the corresponding target resource index and the corresponding target identification information for forwarding the data, thereby improving flexibility, namely, reliability, in forwarding the data.

With reference to any one of the sixth aspect of the embodiments of this application or the first to the third implementations of the sixth aspect of the embodiments of this application, in a fourth implementation of the sixth aspect of the embodiments of this application, the resource index includes a leaky bucket index or a queue index. In other words, during resource scheduling, if a traffic flow rate is controlled through traffic policing, for example, through traffic policing implemented by using a leaky bucket algorithm, in this case, a QoS resource is corresponding to a leaky bucket resource, and a QoS resource index is corresponding to a leaky bucket index; or during resource scheduling, if a traffic flow rate is controlled through traffic shaping, for example, through traffic policing implemented by using a queue algorithm, in this case, a QoS resource is corresponding to a queue resource, and a QoS resource index is corresponding to a queue index. In this embodiment, a type of the resource index may be set based on a resource type, thereby enriching the type of the resource index and implementing diversity of the resource index.

With reference to any one of the sixth aspect of the embodiments of this application or the first to the fourth implementations of the sixth aspect of the embodiments of this application, in a fifth implementation of the sixth aspect of the embodiments of this application, the resource requirement information includes at least one of a bandwidth resource, a burst size, a maximum delay, a maximum delay variation, and a packet loss rate. Depending on an actual requirement, the resource requirement information may further include other information. This is not specifically limited herein. In this embodiment, the resource requirement information may include a variety of information, thereby avoiding unicity of the resource requirement information and implementing diversity of the resource requirement information.

A seventh aspect of the embodiments of this application provides a controller, including: a processor, a memory, a bus, an input apparatus, and an output apparatus, where the memory stores program code; and when invoking the program code in the memory, the processor performs the resource reservation method according to any one of the first aspect of the embodiments of this application or the first to the seventh implementations of the first aspect of the embodiments of this application.

An eighth aspect of the embodiments of this application provides a sending device, including: a processor, a memory, a bus, an input apparatus, and an output apparatus, where the memory stores program code; and when invoking the program code in the memory, the processor performs the resource reservation method according to any one of the second aspect of the embodiments of this application or the first to the third implementations of the second aspect of the embodiments of this application.

A ninth aspect of the embodiments of this application provides a network device, including: a processor, a memory, a bus, an input apparatus, and an output apparatus, where the memory stores program code; and when invoking the program code in the memory, the processor performs the resource reservation method according to any one of the third aspect of the embodiments of this application or the first to the fifth implementations of the third aspect of the embodiments of this application.

A tenth aspect of the embodiments of this application provides a computer program product including an instruction, where when the computer program product is run on a computer, the computer is enabled to perform the resource reservation method according to any one of the first aspect of the embodiments of this application or the first to the seventh implementations of the first aspect of the embodiments of this application.

An eleventh aspect of the embodiments of this application provides a computer program product including an instruction, where when the computer program product is run on a computer, the computer is enabled to perform the resource reservation method according to any one of the second aspect of the embodiments of this application or the first to the third implementations of the second aspect of the embodiments of this application.

A twelfth aspect of the embodiments of this application provides a computer program product including an instruction, where when the computer program product is run on a computer, the computer is enabled to perform the resource reservation method according to any one of the third aspect of the embodiments of this application or the first to the fifth implementations of the third aspect of the embodiments of this application.

A thirteenth aspect of the embodiments of this application provides a computer readable storage medium, where the computer readable storage medium stores an instruction, and when the instruction is run on a computer, the computer is enabled to perform the resource reservation method according to any one of the first aspect of the embodiments of this application or the first to the seventh implementations of the first aspect of the embodiments of this application.

A fourteenth aspect of the embodiments of this application provides a computer readable storage medium, where the computer storage medium stores an instruction, and when the instruction is run on a computer, the computer is enabled to perform the resource reservation method according to any one of the second aspect of the embodiments of this application or the first to the third implementations of the second aspect of the embodiments of this application.

A fifteenth aspect of the embodiments of this application provides a computer readable storage medium, where the computer storage medium stores an instruction, and when the instruction is run on a computer, the computer is enabled to perform the resource reservation method according to any one of the third aspect of the embodiments of this application or the first to the fifth implementations of the third aspect of the embodiments of this application.

It can be learned from the foregoing technical solutions that the embodiments of this application have the following advantages:

The controller obtains, based on the received resource reservation request that is of the communication session and that is sent by the sending device, the identification information of the network device through which the data transmission of the communication session to be performed between the sending device and the receiving device passes, and the resource index of the network device. Then, the controller sends the resource index and the resource requirement information to the network device based on the identification information, so that the network device configures the resource for the communication session based on the resource index and the resource requirement information; and the controller sends the identification information and the resource index to the sending device, so that during sending of the data of the communication session, the sending device can add, to the data, the identification information and the resource index that are corresponding to the communication session, and send the data to the receiving device through the network device. After receiving the data, the network device forwards the data based on the identification information and the resource index that are obtained from the data. In this case, resources of an entire network are managed by the controller, network devices no longer maintain, by using the RSVP on the entire network, a service flow status or perform operations such as forwarding a path message and a resv message to apply for resources in series. Instead, resources are applied for in parallel only from the controller, with no need to consume resources of the network devices to establish a mapping relationship between a service flow and a resource, thereby saving resource overheads of the network devices.

DESCRIPTION OF EMBODIMENTS

To resolve a prior-art technical problem of high resource consumption of a network device, the embodiments of this application provide a resource reservation method. According to the method, a controller may obtain identification information and a resource index that are of a network device through which data transmission of a communication session to be performed between a sending device and a receiving device passes; send the resource index and resource requirement information to the network device based on the identification information, so that the network device configures a resource based on the resource index and the resource requirement information; and send the identification information and the resource index to the sending device, so that the sending device adds the identification information and the resource index to data of the communication session, and sends the data to the receiving device through the network device. In this way, resources of an entire network are managed by the controller, and resources are applied for only from the controller, without consuming resources of the network device that are used for establishing a mapping relationship between a service flow and a resource. The embodiments of this application further provide related devices such as a resource reservation apparatus, a controller, a sending device, a network device, a computer program product, and a computer storage medium.

Figure 1:
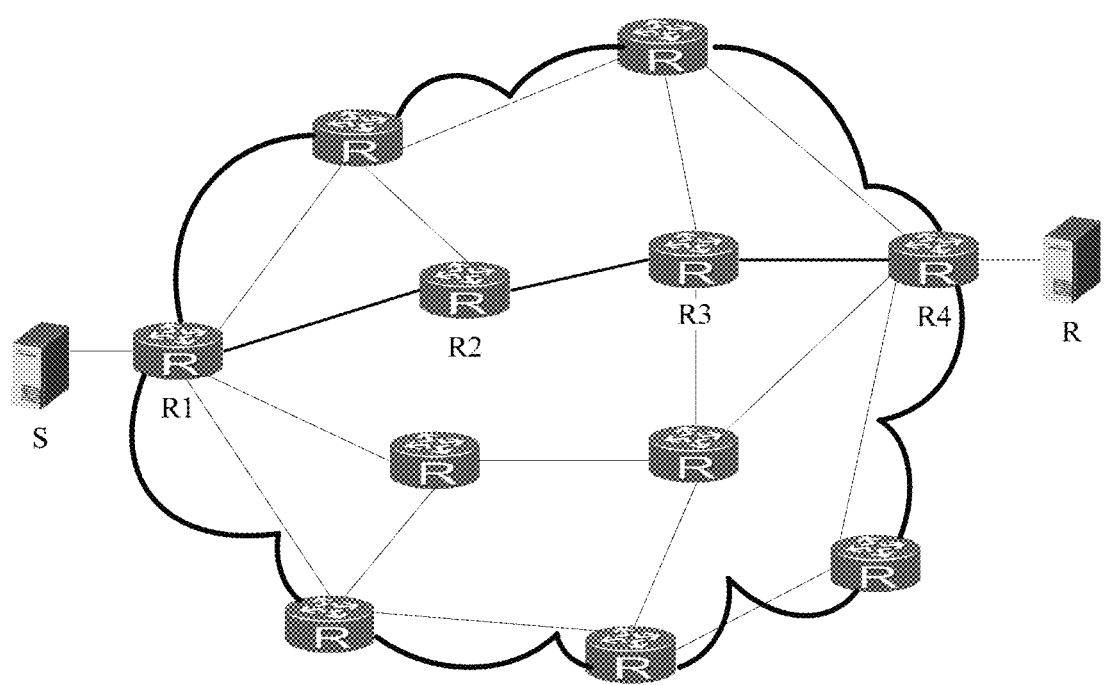
FIG. 1 is a topological diagram of an architecture of a communications network in the prior art.
Figure 2:
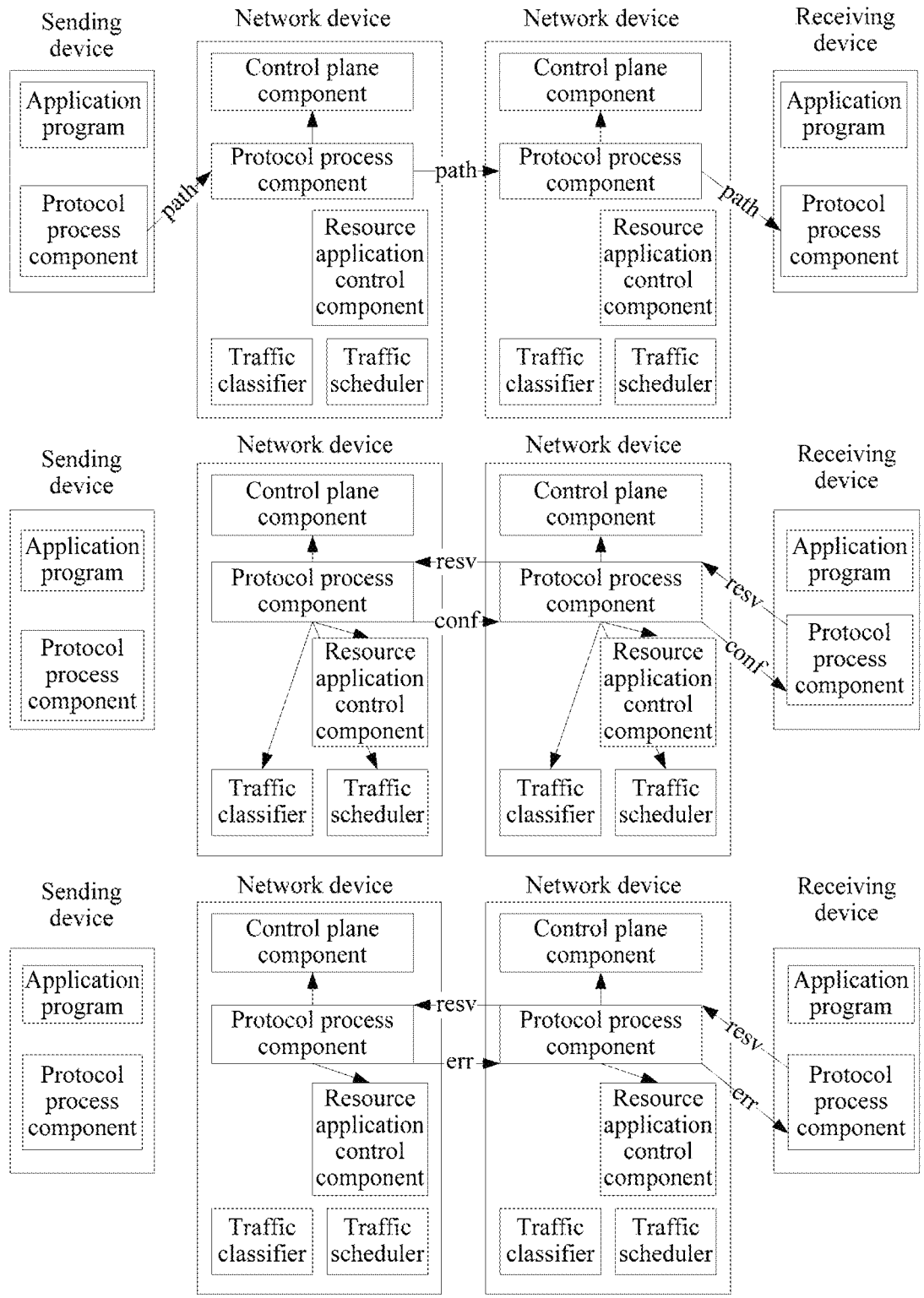
FIG. 2 is a schematic diagram of an embodiment of a resource reservation method in the prior art.
Figure 3:
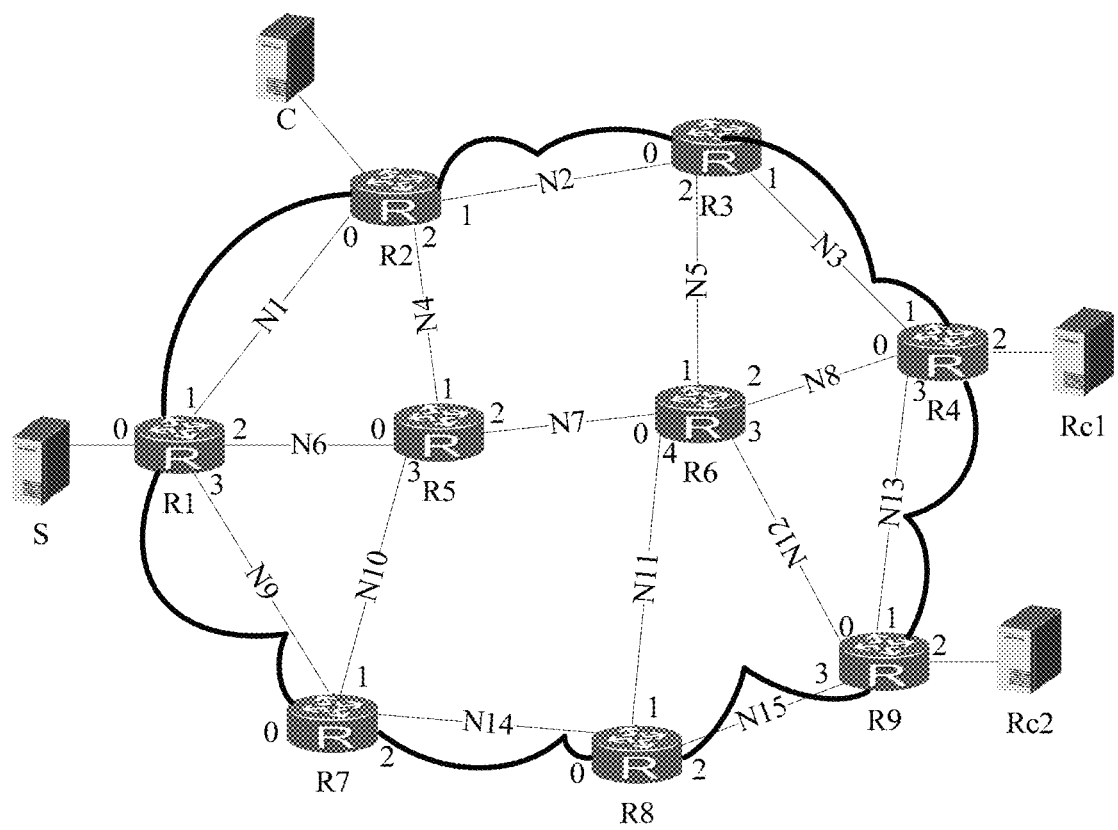
FIG. 3 is a topological diagram of an architecture of a communications network according to an embodiment of this application.

As shown in FIG. 3, a communications network includes a controller C, network devices R1 to R9, a sending device S, a receiving device Rc1, a receiving device Rc2, and the like. 0 to 3 represent interface numbers of network devices, and N1 to N15 represent link bandwidths. The controller manages QoS resources of the entire network and a network topology. The network devices are no longer responsible for resource management. The controller is implemented by deploying controller software on a general-purpose computing system. The network device may include a router, a computer, a switch, or the like, the sending device may include a terminal such as a mobile phone or a computer, and the receiving device may include a terminal such as a mobile phone or a computer. Because the controller manages resources of the entire network, resources do not need to be applied for in series on the entire network by using the network devices; instead, resources are applied for in parallel only from the controller.

Figure 4:
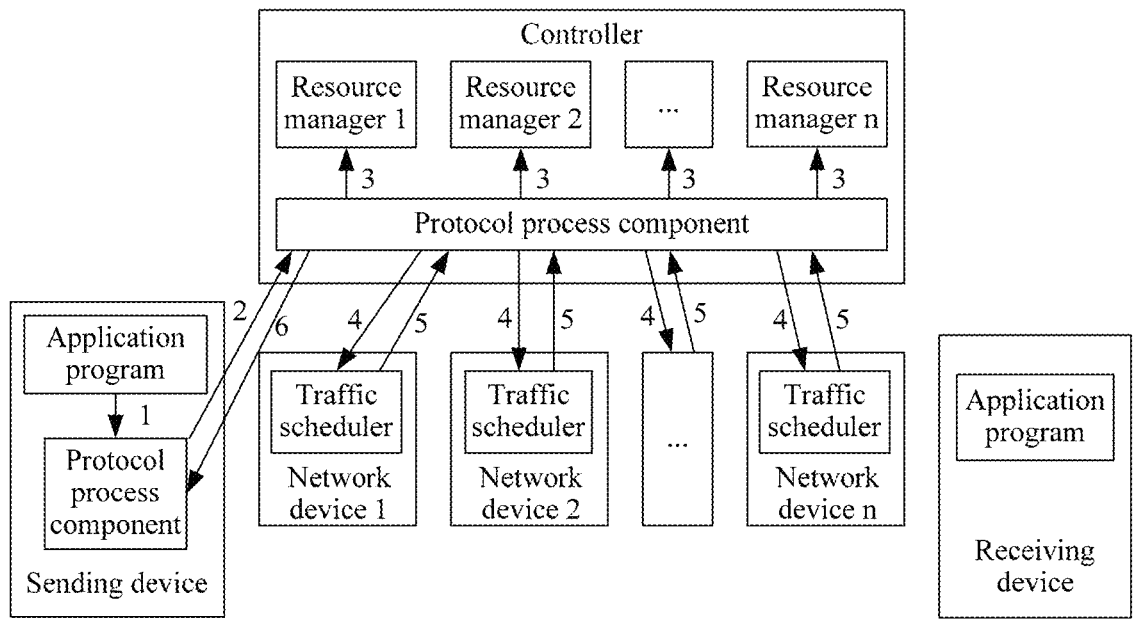
FIG. 4 is a schematic diagram of an embodiment of a resource reservation method according to an embodiment of this application.

The following describes a working principle of managing the entire network by the controller. As shown in FIG. 4, the controller may include a plurality of resource managers, a protocol process component, and the like. The protocol process component is configured to perform an RSVP operation and manage all the resources of the entire network. The resource managers are in a one-to-one correspondence with the network devices, and are configured to be responsible for managing resources of corresponding network devices. In other words, one network device is corresponding to one resource manager, and one resource manager may manage all resource indexes corresponding to one network device. For example, a resource manager 1 is corresponding to a network device 1, a resource manager 2 is corresponding to a network device 2, and a resource manager n is corresponding to a network device n. The sending device includes an application program, a protocol process component, and the like. The protocol process component in the sending device is configured to perform an RSVP operation, and the application program in the sending device is a sender of a service flow. The receiving device includes an application program, a protocol process component, and the like. The protocol process component in the receiving device is configured to perform an RSVP operation, and the application program in the receiving device is a receiver of a service flow. The network device includes a traffic scheduler and the like. The traffic scheduler in the network device is configured to: configure a resource, and obtain, by using a resource index, a resource corresponding to the resource index, for traffic scheduling. Compared with the prior art, the network device in this application may not have a traffic classifier, a resource application control component, a control plane component, and the like, thereby saving overheads of hardware resources of the network device.

Figure 5:
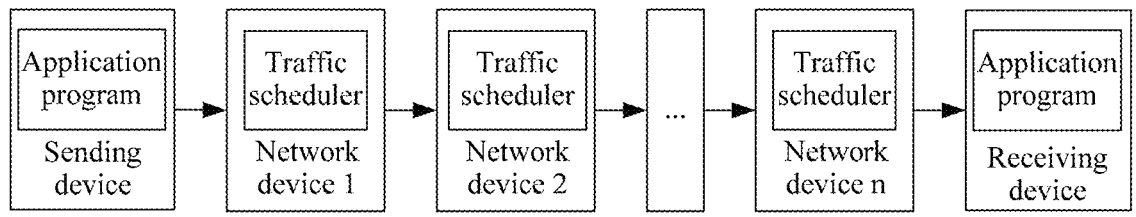
FIG. 5 is a schematic diagram of another embodiment of a resource reservation method according to an embodiment of this application.

When a service (namely, a communication session) in the sending device has a guaranteed-QoS communication requirement, an application program corresponding to the service sends a resource requirement application to the protocol process component of the sending device, where the resource requirement application includes resource requirement information such as a bandwidth resource, a burst, a maximum delay, a maximum delay variation, or a packet loss rate. After receiving the resource requirement application, the protocol process component of the sending device constructs a resource reservation request and sends the resource reservation request to the controller. The controller receives the resource reservation request by using the protocol process component of the controller. The protocol process component in the controller obtains, based on resources of the network devices and the resource requirement information carried in the resource reservation request, a network device through which data transmission of the communication session to be performed between the sending device and the receiving device passes, and determines identification information of the network device. There may be one or more network devices. The protocol process component in the controller sends a resource index request to a resource manager corresponding to the network device, and the resource manager feeds back a determined resource index to the protocol process component. Then, the protocol process component in the controller delivers a resource configuration message to a traffic scheduler in the corresponding network device, where the resource configuration message carries the resource index and the resource requirement information. After receiving the resource configuration message, the traffic scheduler in the network device configures a resource for the service based on the resource index and the resource requirement information. After completing resource configuration, the traffic scheduler feeds back a response message to the protocol process component in the controller. After receiving the response message, the protocol process component in the controller learns that resource configuration is completed, and at this time, sends the identification information and the resource index that are of the corresponding network device to the protocol process component in the sending device. The protocol process component in the sending device stores the identification information and the resource index, and resource reservation is completed. Alternatively, after delivering the request message to the traffic scheduler in the corresponding network device, the protocol process component in the controller determines, after a preset time elapses, that resource configuration is completed, and at this time, sends the identification information and the resource index that are of the corresponding network device to the protocol process component in the sending device. After resource reservation for the application program succeeds, when the application program in the sending device sends data, the sending device sends the stored identification information and resource index to the receiving device along with the data through the network device. As shown in FIG. 5, the network device may forward the data based on the identification information and the resource index that are carried in the data.

It should be noted that an architectural diagram of the communications network shown in FIG. 3 and resource reservation method embodiments shown in FIG. 4 and FIG. 5 are merely examples. A network architecture and a service scenario that are described in the embodiments of this application are intended to describe the technical solutions in the embodiments of this application more clearly, and do not constitute any limitation on the technical solutions provided in the embodiments of this application. Persons of ordinary skill in the art may understand that with evolution of network architectures and emergence of new service scenarios, the technical solutions provided in the embodiments of this application are also applicable to similar technical problems.

Figure 6:
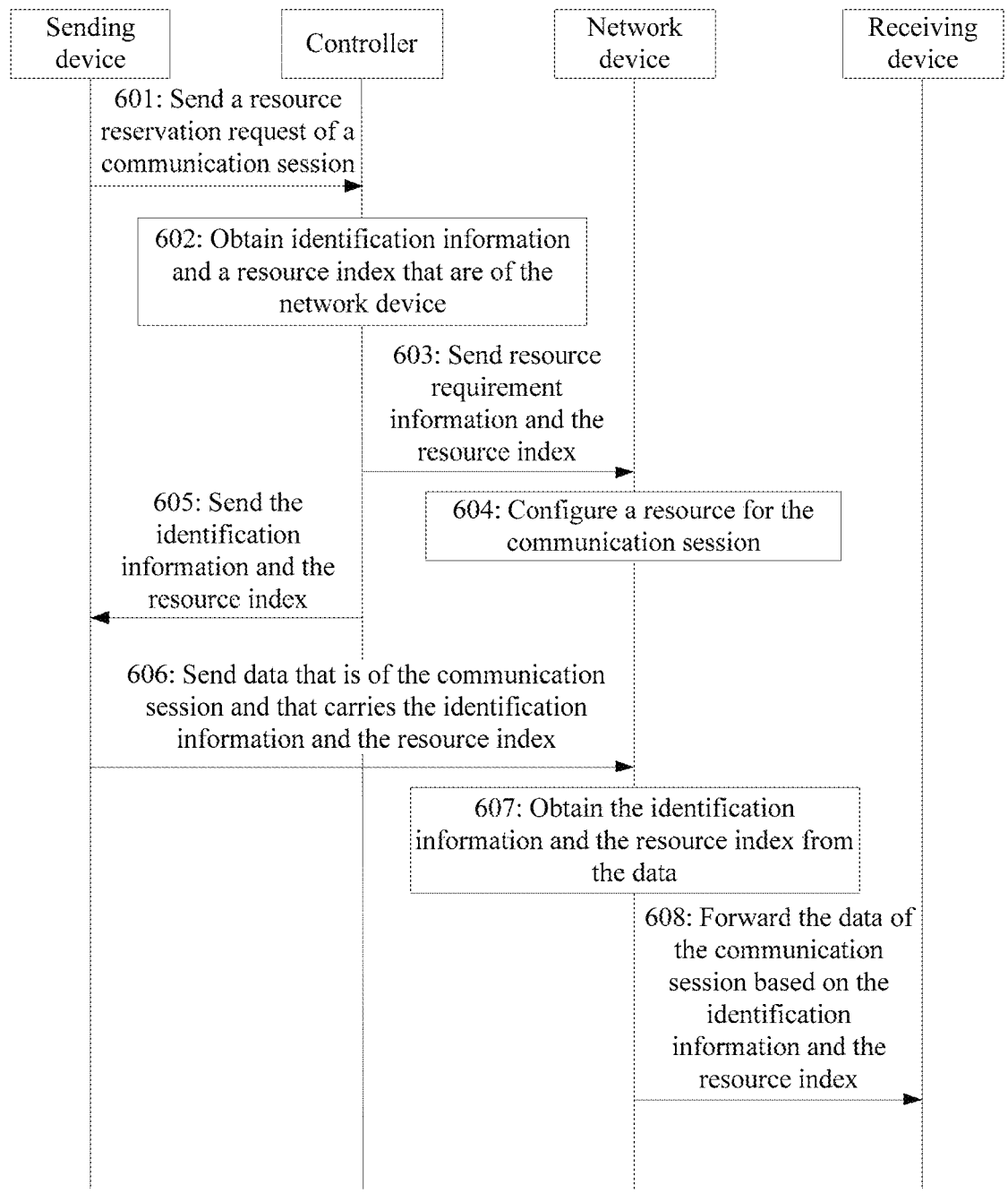
FIG. 6 is a schematic diagram of another embodiment of a resource reservation method according to an embodiment of this application.

For ease of understanding, the following describes a specific procedure in the embodiments of this application. Referring to FIG. 6, an embodiment of a resource reservation method according to an embodiment of this application includes the following steps.

601: A sending device sends a resource reservation request of a communication session to a controller.

The resource reservation request may be sent by the sending device to the controller when the communication session has a guaranteed-QoS communication requirement, may be sent by the sending device to the controller when the communication session needs to send data, or may be sent by the sending device to the controller after the sending device moves to a new location and establishes a connection to a new network device, or may be sent by the sending device to the controller at intervals of a preset time, or may be sent in another manner. This is not specifically limited herein.

The resource reservation request may carry at least one piece of resource requirement information such as a bandwidth resource, a maximum delay, and a packet loss rate, and may further carry a quintuple, for example, a destination address corresponding to a receiving device, a source address corresponding to the sending device, a source port number, a destination port, and a protocol number. The resource reservation request may further carry other information. This is not specifically limited herein.

The communication session may be a service, for example, a call service, a short message service, a voice service, a video service, or a payment service. This is not specifically limited herein.

602: The controller obtains, based on the received resource reservation request, identification information of a network device through which data transmission of the communication session to be performed between the sending device and the receiving device passes, and a resource index of the network device.

After receiving the resource reservation request sent by the sending device, the controller may obtain, based on information carried in the resource reservation request, the identification information of the network device through which the data transmission of the communication session to be performed between the sending device and the receiving device passes, and obtain the resource index of the network device. The identification information may be an address of the network device, or may be related information used for identifying the network device. The resource index is used to identify a corresponding resource and is used for establishing a mapping relationship with the resource. For example, the resource index may be a leaky bucket index, a queue index, or the like.

603: The controller sends the resource index and the resource requirement information to the network device based on the identification information.

After obtaining the identification information of the network device, the controller may send the resource index of the network device and the resource requirement information of the network device to the corresponding network device based on the identification information of the network device, so that the network device configures a corresponding resource for the communication session based on the received resource requirement information and resource index. The resource requirement information is carried in the resource reservation request. For example, the resource requirement information may be at least one of the bandwidth resource, the maximum delay, a burst size, a maximum delay variation, the packet loss rate, and the like.

It can be understood that when there is only one network device, the controller only needs to send, to the network device, resource requirement information and a resource index that are corresponding to the network device, and when there are a plurality of network devices, the controller needs to send, to a corresponding network device, resource requirement information and a resource index that are corresponding to the network device.

604: The network device configures a resource for the communication session based on the received resource index and resource requirement information.

After receiving the resource index and the resource requirement information that are sent by the controller, the network device configures, for the communication session, a resource corresponding to the resource index and the resource requirement information. The resource is corresponding to the resource index, and the resource can meet a requirement corresponding to the resource requirement information.

605: The controller sends the identification information and the resource index to the sending device.

After sending the resource requirement information and the resource index to the network device, the controller sends the identification information of the network device and the resource index of the network device to the sending device. For example, when receiving a response message fed back by the network device after the network device completes resource configuration, the controller may send the identification information of the network device and the resource index of the network device to the sending device. Alternatively, the controller may send the identification information of the network device and the resource index of the network device to the sending device in a preset time after sending the resource requirement information and the resource index to the network device. With the preset time, it can be ensured that the network device has completed resource configuration. The preset time may be flexibly set based on an actual requirement. This is not specifically limited herein. A time at which the controller sends the identification information of the network device and the resource index of the network device to the sending device may be flexibly set based on an actual requirement. This is not specifically limited herein.

606: When the sending device needs to send data of the communication session, the sending device adds the identification information and the resource index to the data, and sends, to the network device, the data that carries the identification information and the resource index.

During sending of the data of the communication session, the sending device may add the identification information of the network device and the resource index of the network device to the data, and then sends, to the network device, the data that carries the identification information and the resource index. Then, the network device sends the data to the receiving device.

It can be understood that, to facilitate subsequent adding of the identification information and the resource index to the data of the communication session by the sending device during sending of the data of the communication session, after receiving the identification information and the resource index that are sent by the controller, the sending device may obtain a session identifier of the communication session, and then store the identification information and the resource index after associating the identification information and the resource index with the session identifier. The sending device may store the identification information and the resource index in the sending device or in a server. This is not specifically limited herein. During sending of the data of the communication session, the sending device first obtains the stored identification information and resource index that are corresponding to the session identifier, then adds the stored identification information and resource index that are obtained to the data, and sends the data to the receiving device through the network device.

607: The network device obtains the identification information and the resource index from the data.

After the network device receives the data that is of the communication session and that is sent by the sending device, because the data carries the identification information and the resource index, the network device can obtain the identification information and the resource index from the data, schedules the corresponding resource based on the identification information and the resource index, and forwards the data to the receiving device.

608: The network device forwards the data of the communication session to the receiving device based on the identification information and the resource index.

The network device receives the data that is of the communication session and that is sent by the sending device. The data carries a target resource index corresponding to the network device and target identification information corresponding to a next hop relative to the network device. The target resource index is included in the resource index, and the target identification information is included in the identification information of the network device through which the data transmission passes. The network device forwards the data based on the target resource index and the target identification information. For example, the network device may determine an output interface corresponding to the target identification information, and obtain a resource corresponding to the target resource index, and then send the data to the next hop relative to the network device by using the output interface and the resource, until a next hop is the receiving device.

In this embodiment of this application, the controller obtains, based on the received resource reservation request that is of the communication session and that is sent by the sending device, the identification information of the network device through which the data transmission of the communication session to be performed between the sending device and the receiving device passes, and the resource index of the network device. Then, the controller sends the resource index and the resource requirement information to the network device based on the identification information, so that the network device configures the resource for the communication session based on the resource index and the resource requirement information; and the controller sends the identification information and the resource index to the sending device, so that during sending of the data of the communication session, the sending device can add, to the data, the identification information and the resource index that are corresponding to the communication session, and send the data to the receiving device through the network device. After receiving the data, the network device forwards the data based on the identification information and the resource index that are obtained from the data. In this case, resources of an entire network are managed by the controller, network devices no longer maintain, by using the RSVP on the entire network, a service flow status or perform operations such as forwarding a path message and a resv message to apply for resources in series. Instead, resources are applied for in parallel only from the controller, with no need to consume resources of the network devices to establish a mapping relationship between a service flow and a resource, thereby saving resource overheads of the network devices.

Figure 7:
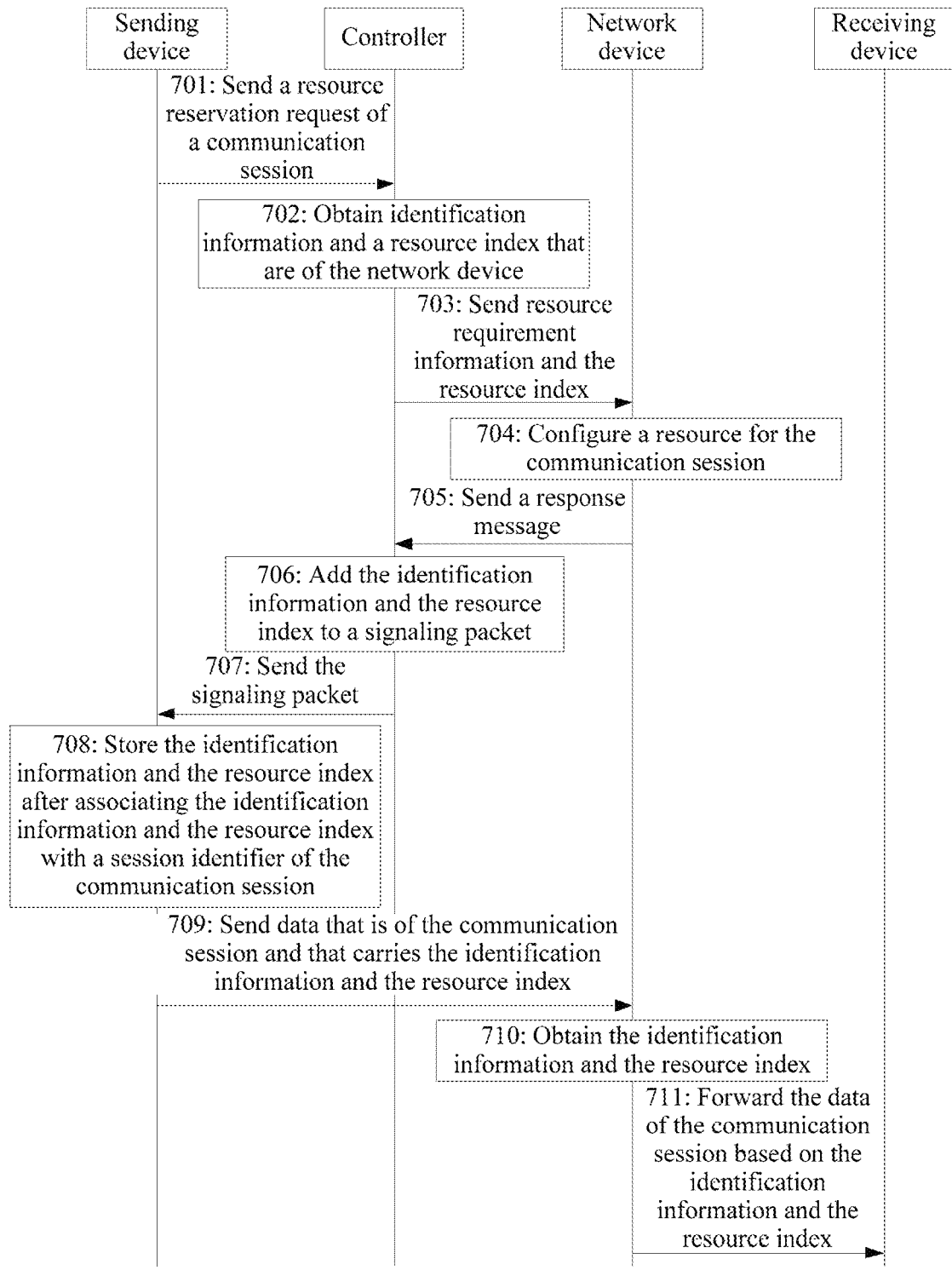
FIG. 7 is a schematic diagram of another embodiment of a resource reservation method according to an embodiment of this application.

For ease of understanding, the following further describes in detail a specific procedure in which the network device feeds back the response message to the controller after completing resource configuration, and the sending device stores the identification information and the resource index after associating the identification information and the resource index with the session identifier of the communication session, and the like in this embodiment of this application. Referring to FIG. 7, another embodiment of a resource reservation method according to an embodiment of this application includes the following steps.

701: A sending device sends a resource reservation request of a communication session to a controller.

The sending device may send the resource reservation request to the controller when the communication session has a guaranteed-QoS communication requirement, the sending device may send the resource reservation request to the controller when the communication session needs to send data, or the sending device may send the resource reservation request to the controller after the sending device moves to a new location and establishes a connection to a new network device, or the sending device may send the resource reservation request to the controller at intervals of a preset time, or the sending device may send the resource reservation request to the controller in another manner. This is not specifically limited herein.

For example, with reference to FIG. 4, when an upper-layer application program (namely, an application program corresponding to the communication session) in the sending device has a guaranteed-QoS communication requirement, the application program sends a resource requirement application to a protocol process component of bottom-layer software of the sending device. The resource requirement application includes resource requirement information such as a bandwidth resource, a burst, a maximum delay, a maximum delay variation, and a packet loss rate, and may further include a source address, a destination address, a source transport layer port number, a destination transport layer port number, a transport layer protocol number, and the like. After receiving the resource requirement application, the protocol process component of the bottom-layer software of the sending device constructs a resource reservation request based on the resource requirement application, and sends the resource reservation request to the controller.

The resource reservation request may carry at least one piece of the resource requirement information such as the bandwidth resource, the burst size, the maximum delay, the maximum delay variation, and the packet loss rate, and may further carry a quintuple, for example, a destination address corresponding to a receiving device, a source address corresponding to the sending device, a source port number, a destination port, and a protocol number. The resource reservation request may further carry other information. A format of the resource reservation request, an order of content in the resource reservation request, and the like are not specifically limited herein.

702: The controller obtains, based on the received resource reservation request, identification information of a network device through which data transmission of the communication session to be performed between the sending device and the receiving device passes, and a resource index of the network device.

After receiving the resource reservation request sent by the sending device, the controller may obtain, based on information carried in the resource reservation request, the identification information of the network device through which the data transmission of the communication session to be performed between the sending device and the receiving device passes, and obtain the resource index of the network device. The identification information may be an address of the network device, or may be related information used for identifying the network device.

It should be noted that the resource index is used to identify a specific resource and is used for establishing a mapping relationship with the resource. For example, the resource index includes a leaky bucket index or a queue index. In other words, during resource scheduling, if a traffic flow rate is controlled through traffic policing, for example, through traffic policing implemented by using a leaky bucket algorithm, in this case, a QoS resource is corresponding to a leaky bucket resource, and a QoS resource index is corresponding to a leaky bucket index; or during resource scheduling, if a traffic flow rate is controlled through traffic shaping, for example, through traffic policing implemented by using a queue algorithm, in this case, a QoS resource is corresponding to a queue resource, and a QoS resource index is corresponding to a queue index.

In this embodiment, each network device has its corresponding resource index. Resource index ranges of network devices may be consistent, or may be inconsistent. Therefore, remaining resource indexes of the network devices may be different, and obtained resource indexes of the network devices through which the data transmission of the communication session to be performed between the sending device and the receiving device passes may be different. Each resource index is corresponding to a network device. It can be understood that in actual application, the resource index, obtained by the controller, of the network device through which the data transmission of the communication session to be performed between the sending device and the receiving device passes may be alternatively set to be consistent with a resource index corresponding to each network device, and a mapping relationship may also be established between the consistent resource index and a target resource index corresponding to each network device. After the resource index of the network device is determined, the target resource index corresponding to each network device can be determined. This is not specifically limited herein.

For example, with reference to FIG. 4, the controller receives the resource reservation request by using the protocol process component of the controller. The protocol process component in the controller obtains, based on resources of the network devices and the resource requirement information carried in the resource reservation request, the network device through which the data transmission of the communication session to be performed between the sending device and the receiving device passes, and determines the identification information of the network device. There may be one or more network devices. The protocol process component in the controller sends a resource index request to a resource manager corresponding to the network device, and the resource manager feeds back a determined resource index to the protocol process component.

The controller may obtain the identification information of the network device and the resource index of the network device based on the resource requirement information and the destination address that are carried in the resource reservation request. Specifically, the controller maintains resources of all network devices in an entire network, and when obtaining the identification information and the resource index that are of the network device, the controller may obtain, by accessing the resources of all the network devices maintained by the controller, an idle resource of the network device through which the data transmission of the communication session to be performed between the sending device and the receiving device passes, where the idle resource may include an idle resource index, an idle bandwidth resource, and the like, and the idle resource can meet a requirement of a resource corresponding to the resource index and the resource requirement information. Then, the controller obtains, based on the resource requirement information, the destination address, and the idle resource, the identification information of the network device through which the data transmission of the communication session to be performed between the sending device and the receiving device passes, and the controller allocates the resource index to the communication session.

When obtaining the identification information of the network device through which the data transmission of the communication session to be performed between the sending device and the receiving device passes, the controller may first obtain, from the entire network maintained by the controller, a path that meets the resource requirement information, the destination address, and the idle resource, and then obtain, from the path, a shortest path that is to be taken for the data transmission to be performed between the sending device and the receiving device. For example, when there is only one path that meets the resource requirement information, the destination address, and the idle resource, the path is the shortest path; and when there are a plurality of paths that meet the resource requirement information, the destination address, and the idle resource, a shortest one of the paths is selected. The controller may calculate the shortest path by running a CSPF algorithm, or may obtain the shortest path by running another algorithm. This is not specifically limited herein. After obtaining the shortest path, the controller determines a corresponding network device on the shortest path, and obtains identification information of the network device.

With reference to FIG. 4, the controller runs the CSPF algorithm by using the protocol process component, and performs calculation based on the information carried in the resource reservation request to obtain a path sequence. Then, the protocol process component sends a resource index request to a resource manager corresponding to each network device on the path sequence. The resource manager returns, to the protocol process component, a resource index that is determined based on the request.

It should be noted that because resource indexes, bandwidth resources, and the like that are of a network device are limited, the controller may fail to obtain the resource index and the identification information. In a process in which the controller runs the CSPF algorithm based on the resource reservation request by using the protocol process component to perform calculation, if the calculation fails, the controller returns a request failure message to the sending device; or if the calculation succeeds, the controller traverses network devices on the path to apply for a resource index. After the resource index is obtained, a resource corresponding to the resource index can be determined.

A case in which the controller fails to obtain the resource index and the identification information includes: One possibility is as follows: Assuming that a network device has a total of 10 resource indexes and the network device has used a large quantity of the resource indexes, there may be still remaining bandwidth resources but the resource indexes have been exhausted. As shown in Table 1, it indicates a case in which there are still remaining bandwidth resources when resource indexes are exhausted.

TABLE 1

| Remaining bandwidth resources still available when resource indexes are exhausted | | | | | | | | | | |
|---|---|---|---|---|---|---|---|---|---|---|
| Total bandwidth resources | | | | | | | | | | |
| Allocated resource indexes | 1 | 2 | 3 | 4 | 5 | 6 | 7 | 8 | 9 | 10 |

Another possibility is as follows: Assuming that a network device has a total of 10 resource indexes and the network device has used a large amount of bandwidth resources, there may be still remaining resource indexes but bandwidth resources have been exhausted. As shown in Table 2, it indicates a case in which there are still remaining bandwidth resources when bandwidth resources are exhausted.

TABLE 2

| Remaining resource indexes still available when bandwidth resources are exhausted | | | | | | | | |
|---|---|---|---|---|---|---|---|---|
| Total bandwidth resources | | | | | | | | |
| Allocated resource indexes | 1 | 2 | 3 | 4 | 5 | 6 | 7 | 8 |

It can be learned that the network device needs to have both sufficient bandwidth resources and at least one idle resource index, so that the path sequence can be successfully returned after CSPF computation is performed. When CSPF computation succeeds, a resource index can be successfully applied for. When failing to obtain the identification information and the resource index that are of the network device, the controller may send the request failure message to the sending device, so that the sending device learns that resource reservation for the communication session fails. Alternatively, when failing to obtain the identification information and the resource index that are of the network device, the controller does not send the request failure message to the sending device. When the sending device does not receive, within a preset time period, the identification information and the resource index that are of the network device and that are sent by the controller, the sending device determines that resource reservation for the communication session fails.

703: The controller sends the resource index and the resource requirement information to the network device based on the identification information.

After obtaining the identification information of the network device, the controller may send the resource index of the network device and the resource requirement information of the network device to the corresponding network device based on the identification information of the network device, so that the network device configures a corresponding resource for the communication session based on the received resource requirement information and resource index. The resource requirement information is carried in the resource reservation request. For example, the resource requirement information may be at least one of the bandwidth resource, the maximum delay, the burst size, the maximum delay variation, the packet loss rate, and the like.

It can be understood that when there is only one network device on the path sequence, the controller only needs to send, to the network device, resource requirement information and a resource index that are corresponding to the network device, and when there are a plurality of network devices on the path sequence, the controller needs to send, to a corresponding network device, resource requirement information and a resource index that are corresponding to the network device.

With reference to FIG. 4, the controller delivers a request message to traffic schedulers in all corresponding network devices on the path sequence by using the protocol process component. The request message carries the resource index and the resource requirement information.

It should be noted that when sending the resource index and the resource requirement information to the network device, the controller may construct a resource configuration message based on the resource index and the resource requirement information, and then send the resource configuration message that carries the resource index and the resource requirement information to the network device, so that the network device configures the resource for the communication session based on the resource configuration message. A type of the resource configuration message may be flexibly set depending on an actual requirement, and is not specifically limited herein.

704: The network device configures the resource for the communication session based on the received resource index and resource requirement information.

After receiving the resource index and the resource requirement information that are sent by the controller, the network device configures, for the communication session, a resource corresponding to the resource index and the resource requirement information. The resource is corresponding to the resource index, and the resource can meet a requirement corresponding to the resource requirement information. With reference to FIG. 4, after receiving the request message, the traffic scheduler in the network device configures the resource for the communication session based on the resource index and the resource requirement information.

705: After completing resource configuration, the network device feeds back a response message to the controller.

After sending the resource requirement information and the resource index to the network device, the controller sends the identification information of the network device and the resource index of the network device to the sending device. To ensure that the controller can send the identification information of the network device and the resource index of the network device to the sending device when resource configuration is completed, the network device feeds back the response message to the controller after configuring the resource for the communication session based on the received resource requirement information and resource index that are sent by the controller. In this way, the controller determines, based on the response message, that the network device has completed resource configuration, and then sends the identification information of the network device and the resource index of the network device to the sending device. For example, after the traffic scheduler in the network device completes resource configuration, the traffic scheduler feeds back the response message to the protocol process component in the controller. A type of the response message may be flexibly set depending on an actual requirement, and is not specifically limited herein.

706: The controller adds the identification information and the resource index to a signaling packet.

707: The controller sends the signaling packet that carries the identification information and the resource index to the sending device.

After receiving the response message sent by the network device, the controller sends the identification information of the network device and the resource index of the network device to the sending device. For example, the controller may send the signaling packet that carries the identification information of the network device and the resource index of the network device to the sending device. A type of the signaling packet is not specifically limited herein.

Specifically, with reference to FIG. 4, after receiving the response message, the protocol process component in the controller learns that resource configuration is completed, and at this time, sends the identification information and the resource index that are of the corresponding network device to the protocol process component in the sending device. The protocol process component in the sending device stores the identification information and the resource index, and resource reservation is completed. It can be understood that, after delivering the request message to the traffic scheduler in the corresponding network device, the protocol process component in the controller determines, after a preset time elapses, that resource configuration is completed, and at this time, sends the identification information and the resource index that are of the corresponding network device to the protocol process component in the sending device.

708: The sending device stores the identification information and the resource index after associating the identification information and the resource index with a session identifier of the communication session.

To facilitate subsequent adding of the identification information and the resource index to the data of the communication session by the sending device during sending of the data of the communication session, after receiving the identification information and the resource index that are sent by the controller, the sending device may obtain the session identifier of the communication session, and then store the identification information and the resource index after associating the identification information and the resource index with the session identifier. The sending device may store the identification information and the resource index in the sending device or in a server. This is not specifically limited herein. During sending of the data of the communication session, the sending device first obtains the stored identification information and resource index that are corresponding to the session identifier, then adds the stored identification information and resource index that are obtained to the data, and sends the data to the receiving device through the network device.

709: When the sending device needs to send the data of the communication session, the sending device adds the identification information and the resource index to the data, and sends, to the network device, the data that carries the identification information and the resource index.

During sending of the data of the communication session, the sending device may first detect whether identification information of a corresponding network device and a resource index of the network device that are for the communication session are stored. If identification information of a corresponding network device and a resource index of the network device that are for the communication session are stored, the sending device adds the stored identification information of the network device and the stored resource index of the network device to the data, and then sends, to the network device, the data that carries the identification information and the resource index. Then, the network device sends the data to the receiving device, as shown in FIG. 5. The sending device may sequentially add, to the data of the communication session, identification information and resource indexes that are corresponding to all network devices through which the data transmission of the communication session to be performed between the sending device and the receiving device passes. If identification information of a corresponding network device and a resource index of the network device that are for the communication session are not stored, the sending device directly sends the data of the communication session to the receiving device through the network device.

The data, of the communication session, sent by the sending device to the receiving device through the network device may be a data packet, or may be data of another type. A type of the data may include IPv6, IPv4, MPLS, or the like. It can be understood that the type of the data may further include another type. This is not specifically limited herein. When the type of the data of the communication session is IPv6, during sending of the data of the communication session, the sending device may add the identification information and the resource index to an IPv6 header and send the IPv6 to the receiving device through the network device. For example, a field for extending the IPv6 header may be used, and the identification information and the resource index are added to the IPv6 extension field. When the type of the data of the communication session is IPv4, during sending of the data of the communication session, the sending device may add the identification information and the resource index to an IPv4 header and send the IPv4 to the receiving device through the network device. For example, a field for extending the IPv4 header may be used, and the identification information and the resource index are added to the IPv4 extension field. When the type of the data of the communication session is MPLS, during sending of the data of the communication session, the sending device may add the identification information and the resource index to an MPLS header and send the MPLS to the receiving device through the network device. For example, a field for extending the MPLS header may be used, and the identification information and the resource index are added to the MPLS extension field.

The following uses IPv6 as an example for description. During sending of the data of the communication session, the sending device constructs an IPv6 routing header of a type 4, and fills in, in each segment segment, identification information and a resource index that are of each network device, as shown in Table 3. Then, the sending device sends the routing header to the receiving device through the network device. The IPv6 routing header is a routing header of a newly added type (type=4), and is an extension of a type-0 routing header. In each segment, a QoS header field is extended to cart a QoS resource index. In Table 3, Address[1] to Address[n] are identification information of network devices, and QoS header[1] to QoS header[n] are resource indexes of the network devices.

TABLE 3

Adding identification information and a resource index that are of a network device to data of a communication session

| Next Header | Hdr Ext Len | Routing Type = 4 | Segments Left |
|---|---|---|---|
| | | Reserved | |
| | | Address[1] | |
| | | QoS header[1] | |
| | | Address[2] | |
| | | QoS header[2] | |
| | | . . . | |
| | | Address[n] | |
| | | QoS header[n] | |

710: The network device obtains the identification information and the resource index from the data.

After the network device receives the data that is of the communication session and that is sent by the sending device, because the data carries the identification information and the resource index, the network device can obtain the identification information and the resource index from the data, schedules the corresponding resource based on the identification information and the resource index, and forwards the data to the receiving device. In this case, the network device no longer needs to obtain the identification information and the resource index by using a traffic classifier.

711: The network device forwards the data of the communication session to the receiving device based on the identification information and the resource index.

The data transmission of the communication session to be performed between the sending device and the receiving device may pass one or more network devices. Therefore, the data that is of the communication session and that is sent by the sending device and received by the network device carries a target resource index corresponding to the network device and target identification information corresponding to a next hop relative to the network device. The target resource index is included in the resource index of the network device through which the data transmission of the communication session to be performed between the sending device and the receiving device passes, and the target identification information is included in the identification information of the network device through which the data transmission passes. The network device forwards the data based on the target resource index and the target identification information.

In a process in which the network device forwards the data of the communication session based on the target resource index and the target identification information, the network device first obtains, from the first instruction section of the data, the target resource index corresponding to the network device and the target identification information corresponding to the next hop relative to the network device. Then, the network device obtains an output interface corresponding to the target identification information, and deletes the target identification information after obtaining the output interface. The network device obtains, from a traffic scheduler pre-configured in the network device, a resource corresponding to the target resource index, schedules the resource, and deletes the target resource index after obtaining the resource. The network device sends the data of the communication session to the next hop relative to the network device by using the output interface and the resource, until a next hop is the receiving device. In this embodiment, the network device may forward the data based on identification information and resource indexes that are sequentially stored in the data and that are corresponding to all network devices through which the data transmission of the communication session to be performed between the sending device and the receiving device passes. When forwarding the data, the network device obtains the target identification information and the target resource index that are stored in the first instruction section. For example, IPv6 is used as an example. The network device displays an outermost segment of a routing header, and extracts target identification information and a target resource index that are in a QoS header of the segment. The traffic scheduler in the network device performs addressing for a corresponding resource based on the target resource index, and performs scheduling. After using the target identification information and the target resource index, the network device deletes the target identification information and the target resource index. When the data is transmitted to a next-hop network device, the next-top network device also obtains target identification information and a target resource index that are stored in the first instruction section, and deletes the target identification information and the target resource index after using the target identification information and the target resource index, until a next hop is the receiving device.

Alternatively, in a process in which the network device forwards the data of the communication session based on the target resource index and the target identification information, the network device first obtains, from the data of the communication session based on an offset corresponding to the network device among all the network devices through which the data transmission of the communication session to be performed between the sending device and the receiving device passes, the target resource index corresponding to the network device and the target identification information corresponding to the next hop relative to the network device. The offset may represent an order of the network devices through which the data transmission of the communication session to be performed between the sending device and the receiving device passes. Then, the network device obtains an output interface corresponding to the target identification information, and obtains, from a traffic scheduler pre-configured in the network device, a resource corresponding to the target resource index, and schedules the resource. The network device sends the data of the communication session to the next hop by using the output interface and the resource, until a next hop is the receiving device. In other words, when data arrives at a last network device among all the network devices through which the data transmission of the communication session to be performed between the sending device and the receiving device passes, destination identification information obtained by the last network device is the destination address corresponding to the receiving device.

When forwarding the data of the communication session, during resource scheduling, the network device may control a traffic flow rate through traffic policing. Traffic policing is a QoS technology that controls a traffic rate: First, a target traffic rate is set; and when a traffic rate at which the network device forwards data is less than or equal to the target traffic rate, all traffic passes; or when a traffic rate at which the network device forwards data is greater than the target traffic rate, traffic that exceeds the target traffic rate is discarded. For example, traffic policing may be implemented by using a leaky bucket algorithm, and in this case, a QoS resource is corresponding to a leaky bucket resource, and a QoS resource index is corresponding to a leaky bucket index.

Implementing traffic policing by using the leaky bucket algorithm is specifically: A leaky bucket counter bucket (unit: bytes) is first set, an upper threshold (unit: bytes) is configured, and an accumulative rate (unit: bytes/second) is configured.

Assuming that a timer period is expressed in seconds, and the leaky bucket counter is accumulated according to the following logic:

bucket=(bucket+rate>threshold) ? threshold:bucket+rate;

When the data packet of the communication session needs to be sent, processing is performed according to the following logic:

```
if (bucket >= packet_size)
{
    pass(packet):
    bucket -= packet_size;
}
else
    drop(packet);
```

Implementing traffic policing by using the leaky bucket algorithm does not result in an increase in a delay, and improves data sending efficiency.

When forwarding the data of the communication session, during resource scheduling, the network device may alternatively control a traffic flow rate through traffic shaping. Traffic shaping is also a QoS technology that controls a traffic rate: A buffer is first used to receive traffic, and the traffic is output at a constant rate. A queue is usually used to implement traffic shaping: Input data first enters a queue; data in the queue leaves the queue at a configured and fixed traffic rate; data is not allowed to enter the queue after the queue is full, and traffic corresponding to data that enters the queue after the queue is full is discarded; and when the queue is not full, to control a length of the queue, a specific policy (for example, RED or CoDel) may be used to proactively discard traffic corresponding to data that enters the queue after the queue is full. If traffic shaping is implemented by using a queue, a QoS resource is corresponding to a queue resource, and a QoS resource index is corresponding to a queue index. When traffic shaping is implemented by using a queue, a burst withstanding capability is strong.

In this embodiment, a centralized resource reservation mechanism and a contextless forwarding mechanism are implemented, all resource reservation applications are completed on the controller, and the CSPF algorithm can determine, at one time, whether a resource can be successfully applied for, thereby avoiding a prior-art problem in the RSVP of first applying for and then rolling back. In addition, the network device obtains the target resource index and the target identification information directly from a header of data, thereby avoiding use of a traffic classifier. As a result, there is no control plane context on the network device, with no need to consume a resource for a context of the network device.

The following describes in detail the resource reservation method in this application with reference to a specific application scenario. As shown in FIG. 3, in FIG. 3, network devices R1 to R9, a sending device S, a receiving device Rc1, a receiving device Rc2, and a controller C form a network. In FIG. 3, numbers 0 to 3 at two ends of links represent interface numbers of network devices, and numbers N1 to N15 on links represent bandwidth resources (unit: Mbps) of the links. IP addresses of interfaces of the network devices R1 to R9, an IP address of the sending device, and IP addresses of the receiving devices are shown in Table 4. The IP addresses mentioned herein are corresponding to the foregoing mentioned identification information. In other words, the foregoing mentioned identification information may be an IP address.

TABLE 4

| Mapping relationship between an interface of each device and an IP address | | |
|---|---|---|
| Device | Interface | IP address |
| R1 | 0 | FFF0::1 |
| R1 | 1 | FFF1::1 |
| R1 | 2 | FFF2::1 |
| R1 | 3 | FFF3::1 |
| R2 | 0 | FFF1::2 |
| R2 | 1 | FFF4::1 |
| R2 | 2 | FFF5::1 |
| R3 | 0 | FFF4::2 |
| R3 | 1 | FFF6::1 |
| R3 | 2 | FFF7::1 |
| R4 | 0 | FFF8::1 |
| R4 | 1 | FFF6::2 |
| R4 | 2 | FFF9::1 |
| R4 | 3 | FFFA::1 |
| R5 | 0 | FFF2::2 |
| R5 | 1 | FFF5::2 |
| R5 | 2 | FFFB::1 |
| R5 | 3 | FFFC::1 |
| R6 | 0 | FFFB::2 |

TABLE 4-continued

Mapping relationship between an interface
of each device and an IP address

| Device | Interface | IP address |
|---|---|---|
| R6 | 1 | FFF7::2 |
| R6 | 2 | FFF8::2 |
| R6 | 3 | FFFD::1 |
| R6 | 4 | FFFE::1 |
| R7 | 0 | FFF3::2 |
| R7 | 1 | FFFC::2 |
| R7 | 2 | FFFF::1 |
| R8 | 0 | FFFF::2 |
| R8 | 1 | FFFE::2 |
| R8 | 2 | FFFF::1 |
| R9 | 0 | FFFD::2 |
| R9 | 1 | FFFA::2 |
| R9 | 2 | FFEF::1 |
| R9 | 3 | FFFF::2 |
| S | NA | FFF0::2 |
| Rc1 | NA | FFF9::2 |
| Rc2 | NA | FFEF::2 |

It is assumed that the sending device S needs to send a communication session to the receiving device Rc1 through network devices, where resources with a guaranteed bandwidth resource being 30 Mbps and a guaranteed maximum delay being 100 ms need to be reserved for the communication session; a quintuple of the communication session is (a source IP address being FFF0::2, a destination IP address being FFF9::2, a source port number being 80, a destination port being 80, and a protocol number being 6); a bandwidth resource of each link N1 to N15 in FIG. 3 is 50 Mbps; and resource indexes of each network device are 0 to 100.

First, the sending device S sends a resource reservation request to the controller C. The resource reservation request carries the destination address FFF9::2 corresponding to the receiving device Rc1. A QoS resource requirement includes the bandwidth resource of 30 Mbps, the delay requirement of 100 ms, and the like. The resource reservation request may further carry the quintuple (FFF0::2,FFF9::2,80,80,6).

Second, after receiving the resource reservation request, the controller C performs CSPF computation. In this case, because the bandwidth resource of each link is 50 Mbps and is greater than 30 Mbps in the resource requirement, there is no link to be excluded, thereby obtaining a shortest path of R1 (2)→R5 (2)→R6 (2)→R4 (2). In other words, network devices through which data transmission of the communication session to be performed between the sending device S and the receiving device Rc1 passes are the network device R1→the network device R5→the network device R6→the network device R4 sequentially. An output interface of each network device is numbered 2. It is obtained according to Table 1 that IP addresses corresponding to the network devices R1, R5, R6, and R4 are FFF2::1, FFFB::1, FFF8::2, and FFF9::1, respectively. After determining the IP addresses of the network devices through which the data transmission passes, the controller C traverses resources of the network devices to obtain corresponding resource indexes. In this case, because resource indexes of each network device are not exhausted, a resource index list of (10,100,20,100) is obtained. In other words, an obtained resource index corresponding to the network device R1 is 10, an obtained resource index corresponding to the network device R5 is 100, an obtained resource index corresponding to the network device R6 is 20, and an obtained resource index corresponding to the network device R4 is 100.

After obtaining the IP addresses of the network devices and the resource indexes corresponding to the network devices, the controller C sends a resource configuration message carrying resource requirements such as a resource index, the bandwidth resource of 30 Mbps, and the delay requirement of 100 ms to the network devices R1, R5, R6, and R4. The network devices R1, R5, R6, and R4 configure a corresponding resource for the communication session based on the received resource configuration message. In other words, the network device R1 reserves a resource with the resource index being 10, the bandwidth resource being 30 Mbps, and the delay being 100 ms for the communication session, the network device R5 reserves a resource with the resource index being 100, the bandwidth resource being 30 Mbps, and the delay being 100 ms for the communication session, the network device R6 reserves a resource with the resource index being 20, the bandwidth resource being 30 Mbps, and the delay being 100 ms for the communication session, and the network device R4 reserves a resource with the resource index being 100, the bandwidth resource being 30 Mbps, and the delay being 100 ms for the communication session. After completing resource configuration, the network devices R1, R5, R6, and R4 feed back a response message to the controller C, to notify the controller C of completion of resource configuration.

After receiving the response messages from the network devices R1, R5, R6, and R4, the controller C sends the obtained IP addresses and the resource indexes that are of the network devices to the sending device S. Because the sending device S accesses the network through the network device R1, the controller C does not need to send the IP address of the network device R1 to the sending device S, and only needs to send the IP addresses of the network devices R5, R6, and R4 and the receiving device Rc1, and the obtained resource indexes to the sending device S.

Then, the sending device S stores the received IP addresses and resource indexes that are of the network devices after associating the IP addresses and the resource indexes with a session identifier of the communication session. For example, the sending device S stores, in the sending device S, an instruction string of a mapping relationship formed between the IP addresses of the network devices, the resource indexes of the network devices, and (FFF0::2,FFF9::2,80,80,6). The instruction string may be a string formed sequentially by the IP addresses and the resource indexes that are of the network devices through which the data transmission of the communication session to be performed between the sending device S and the receiving device Rc1 passes. When the sending device S needs to send data of the communication session, the sending device S detects, based on the session identifier, that the instruction string of the communication session is stored. In this case, the sending device S obtains a header of the data into which the instruction string is inserted, and sends the header to the network devices along with the data. Specifically, the sending device S may construct an instruction string in a form of an IPv6 routing header; newly add a routing header (type=4) in the IPv6 routing header, where the routing header (type=4) is an extension of a type-0 routing header; and fills in, in extension fields in segments, the obtained IP addresses and resource indexes that are of the network devices, as shown in Table 5 below.

TABLE 5

IP addresses and resource indexes that are of network devices and that are added to IPv6

| Next Header | Hdr Ext Len | Routing Type = 4 | Segments Left |
|---|---|---|---|
| Reserved | | | |
| FFFB::1 | | | |
| 10 | | | |
| FFF8::2 | | | |
| 100 | | | |
| FFF9::1 | | | |
| 20 | | | |
| FFF9::2 | | | |
| 100 | | | |

Finally, the sending device S first sends, to the network device R5 through the network device R1, the data that carries the instruction string formed by the IP addresses and the resource indexes.

Specifically, after receiving the data of the communication session of the sending device, the network device R1 detects that the data carries the instruction string. In this case, the network device R1 displays the first instruction section, obtains a next-hop address being FFFB::1, and then searches for a routing table to obtain the output interface numbered 2. The first instruction section does not exist (for example, being deleted) in the header of the data after being displayed. The obtained next-hop address is the IP address corresponding to the network device R5. The network device R1 sends, through a switched network inside the network device R1, the data to a downlink line card on which the interface 2 is located. The data is scheduled in a scheduler in the downlink line card by using a bandwidth resource obtained based on the index 10, and sent to a next hop, that is, sent to the network device R5.

After receiving the data, the network device R5 displays the first instruction section, obtains a next-hop address being FFF8::1, and then searches for a routing table to obtain the output interface numbered 2. In this case, the network device R5 sends, through a switched network, the data to a downlink line card on which the interface 2 is located. The data is scheduled in a scheduler in the downlink line card by using a bandwidth resource obtained based on the index 100, and sent to a next hop, that is, sent to the network device R6.

After receiving the data, the network device R6 displays the first instruction section, obtains a next-hop address being FFF9::1, and then searches for a routing table to obtain the output interface numbered 2. In this case, the network device R6 sends, through a switched network, the data to a downlink line card on which the interface 2 is located. The data is scheduled in a scheduler in the downlink line card by using a bandwidth resource obtained based on the index 20, and sent to a next hop, that is, sent to the network device R4.

After receiving the data, the network device R4 displays the first instruction section, obtains a next-hop address being FFF9::2, and then searches for a routing table to obtain the output interface numbered 2. In this case, the network device R4 sends, through a switched network, the data to a downlink line card on which the interface 2 is located. The data is scheduled in a scheduler in the downlink line card by using a bandwidth resource obtained based on the index 100, and sent to a next hop, that is, sent to the receiving device Rc1. Finally, the receiving device Rc1 receives the data of the communication session, and completes a data forwarding process by using reserved resources.

Figure 8:
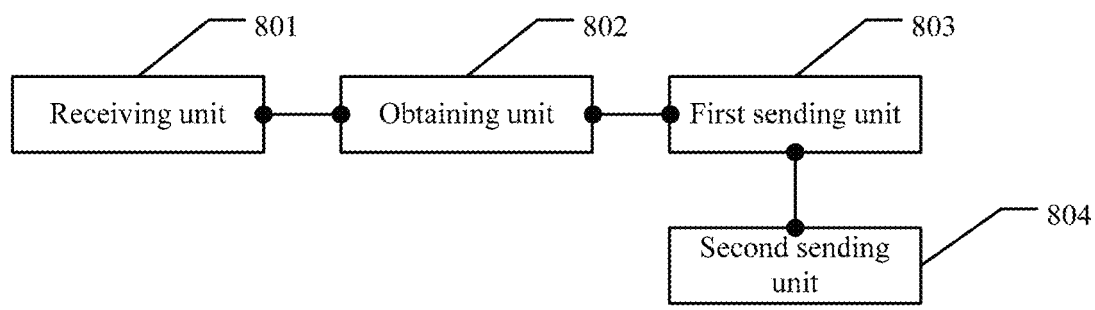
FIG. 8 is a schematic diagram of an embodiment of a resource reservation apparatus according to an embodiment of this application.

The foregoing describes the resource reservation method in the embodiments of this application, and the following describes a resource reservation apparatus in the embodiments of this application. Referring to FIG. 8, an embodiment of a resource reservation apparatus according to an embodiment of this application includes:

a receiving unit 801, configured to receive a resource reservation request that is of a communication session and that is sent by a sending device, where the resource reservation request carries resource requirement information;

an obtaining unit 802, configured to obtain, based on the resource reservation request received by the receiving unit 801, identification information of a network device through which data transmission of the communication session to be performed between the sending device and a receiving device passes, and a resource index of the network device;

a first sending unit 803, configured to send, to the network device based on the identification information obtained by the obtaining unit 802, the resource requirement information received by the receiving unit 801 and the resource index obtained by the obtaining unit 802, where the resource requirement information and the resource index are used to instruct the network device to configure a resource for the communication session; and a second sending unit 804, configured to send, to the sending device, the identification information and the resource index that are obtained by the obtaining unit 802.

It should be noted that in this embodiment of this application, procedures performed by the units in the resource reservation apparatus are similar to procedures of the method described in the foregoing embodiments shown in FIG. 3 to FIG. 6, and details are not described herein again.

In some embodiments of this embodiment of this application, the second sending unit 804 is specifically configured to: receive a response message that is fed back by the network device after the network device completes resource reservation based on the resource requirement information and the resource index; and send, to the sending device based on the response message, the identification information and the resource index that are obtained by the obtaining unit 802.

In some embodiments of this embodiment of this application, the resource reservation request further carries a destination address corresponding to the receiving device, and the obtaining unit 802 is specifically configured to obtain the identification information and the resource index based on the resource requirement information and the destination address that are received by the receiving unit 801.

In some embodiments of this embodiment of this application, the obtaining unit 802 includes: a first obtaining subunit, configured to obtain an idle resource of the network device by accessing resources of all network devices maintained by the controller; a second obtaining subunit, configured to obtain the identification information based on the resource requirement information received by the receiving unit 801, the destination address received by the receiving unit 801, and the idle resource obtained by the first obtaining subunit; and an allocation subunit, configured to allocate the resource index to the communication session.

In some embodiments of this embodiment of this application, the second obtaining subunit is specifically configured to: obtain, from a network, a path that meets the resource requirement information, the destination address, and the idle resource; obtain, from the path, a shortest path that is to be taken for the data transmission to be performed between the sending device and the receiving device; and determine the identification information based on the shortest path.

In some embodiments of this embodiment of this application, the second sending unit 804 is specifically configured to: add, to a signaling packet, the identification information and the resource index that are obtained by the obtaining unit 802; and send the signaling packet that carries the identification information and the resource index to the sending device.

In some embodiments of this embodiment of this application, the resource index includes a leaky bucket index or a queue index.

In some embodiments of this embodiment of this application, the resource requirement information includes at least one of a bandwidth resource, a burst size, a maximum delay, a maximum delay variation, and a packet loss rate.

It should be noted that in some embodiments of this embodiment of this application, procedures performed by the units in the resource reservation apparatus are similar to procedures of the method described in the foregoing embodiments shown in FIG. 3 to FIG. 7, and details are not described herein again.

Figure 9:
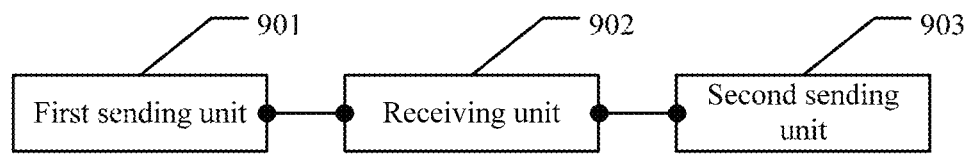
FIG. 9 is a schematic diagram of another embodiment of a resource reservation apparatus according to an embodiment of this application.

Referring to FIG. 9, another embodiment of a resource reservation apparatus according to an embodiment of this application includes:
- a first sending unit 901, configured to send a resource reservation request of a communication session to a controller;
- a receiving unit 902, configured to receive feedback information that is fed back by the controller based on the resource reservation request sent by the first sending unit 901, where the feedback information carries identification information of a network device through which data transmission of the communication session passes, and a resource index of the network device; and
- a second sending unit 903, configured to: add, to data of the communication session, the identification information and the resource index that are received by the receiving unit 902, and send the data to a receiving device through the network device.

In some embodiments of this embodiment of this application, the resource reservation apparatus further includes: an obtaining unit, configured to obtain a session identifier of the communication session; and a storage unit, configured to: store the identification information received by the receiving unit 902 and the resource index received by the receiving unit 902 after associating the identification information and the resource index with the session identifier obtained by the obtaining unit, where the second sending unit 903 is specifically configured to: obtain the stored identification information and resource index based on the session identifier obtained by the obtaining unit, add the identification information and the resource index to the data, and send the data to the receiving device through the network device.

In some embodiments of this embodiment of this application, a type of the data includes internet protocol version 6 IPv6, internet protocol version 4 IPv4, or multiprotocol label switching MPLS.

In some embodiments of this embodiment of this application, the second sending unit 903 is specifically configured to: add the identification information and the resource index to an IPv6 header, an IPv4 header, or an MPLS header, and send the IPv6, the IPv4, or the MPLS to the receiving device through the network device.

It should be noted that in this embodiment of this application, procedures performed by the units in the resource reservation apparatus are similar to procedures of the method described in the foregoing embodiments shown in FIG. 3 to FIG. 7, and details are not described herein again.

Figure 10:
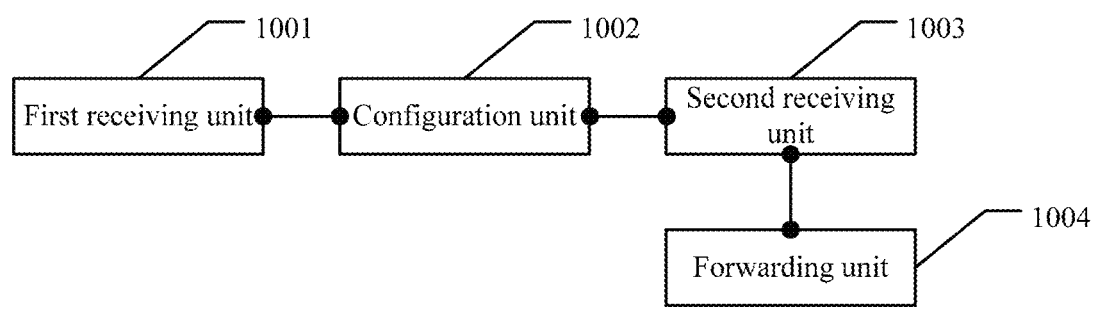
FIG. 10 is a schematic diagram of another embodiment of a resource reservation apparatus according to an embodiment of this application.

Referring to FIG. 10, another embodiment of a resource reservation apparatus according to an embodiment of this application includes:
- a first receiving unit 1001, configured to receive resource requirement information of a communication session and a resource index that are sent by a controller;
- a configuration unit 1002, configured to configure a resource for the communication session based on the resource requirement information and the resource index that are received by the first receiving unit 1001, where the resource is corresponding to the resource index;
- a second receiving unit 1003, configured to receive data that is of the communication session and that is sent by a sending device, where the data carries a target resource index corresponding to the network device and target identification information corresponding to a next hop relative to the network device, the target resource index is included in the resource index, and the target identification information is included in identification information of a network device through which the data transmission passes; and
- a forwarding unit 1004, configured to forward, based on the target resource index and the target identification information that are received by the second receiving unit 1003, the data received by the second receiving unit 1003.

In some embodiments of this embodiment of this application, the resource reservation apparatus further includes a feedback unit, configured to feed back a response message to the controller after the configuration unit 1002 configures the resource.

In some embodiments of this embodiment of this application, the forwarding unit 1004 is specifically configured to: obtain, from the first instruction section of the data received by the second receiving unit 1003, the target resource index corresponding to the network device and the target identification information corresponding to the next hop relative to the network device; obtain an output interface corresponding to the target identification information; delete the target identification information; obtain a resource corresponding to the target resource index; delete the target resource index; and send the data to the next hop relative to the network device by using the output interface and the resource, until a next hop is the receiving device.

In some embodiments of this embodiment of this application, the forwarding unit 1004 is specifically configured to: obtain, from the data received by the second receiving unit 1003 and based on an offset corresponding to the network device, the target resource index corresponding to the network device and the target identification information corresponding to the next hop relative to the network device; obtain an output interface corresponding to the target identification information; obtain a resource corresponding to the target resource index; and send the data to the next hop relative to the network device by using the output interface and the resource, until a next hop is the receiving device.

In some embodiments of this embodiment of this application, the resource index includes a leaky bucket index or a queue index.

In some embodiments of this embodiment of this application, the resource requirement information includes at least one of a bandwidth resource, a burst size, a maximum delay, a maximum delay variation, and a packet loss rate.

It should be noted that in this embodiment of this application, procedures performed by the units in the resource reservation apparatus are similar to procedures of the method described in the foregoing embodiments shown in FIG. 3 to FIG. 7, and details are not described herein again.

Figure 11:
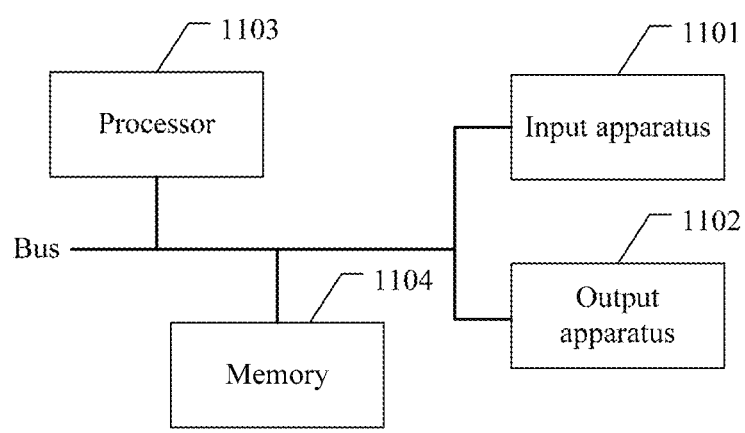
FIG. 11 is a schematic diagram of an embodiment of a controller according to an embodiment of this application.

The foregoing describes the resource reservation apparatuses in the embodiments of this application from a perspective of a modular functional entity, and the following describes a controller in the embodiments of this application from a perspective of hardware processing. Referring to FIG. 11, an embodiment of a controller according to an embodiment of this application includes:

an input apparatus 1101, an output apparatus 1102, a processor 1103, and a memory 1104 (a network device may have one or more processors 1103, and one processor 1103 is used as an example in FIG. 11). In some embodiments of this application, the input apparatus 1101, the output apparatus 1102, the processor 1103, and the memory 1104 may be connected through a bus or in another manner. In FIG. 11, that the input apparatus 1101, the output apparatus 1102, the processor 1103, and the memory 1104 are connected through a bus is used as an example. The memory 1104 stores program code, and by invoking the program code stored in the memory 1104, the processor 1103 is configured to perform the method in the foregoing embodiments shown in FIG. 3 to FIG. 7.

An embodiment of a sending device in the embodiments of this application includes: an input apparatus, an output apparatus, a processor, and a memory (a network device may have one or more processors). In some embodiments of this application, the input apparatus, the output apparatus, the processor, and the memory may be connected through a bus or in another manner. The memory stores program code, and by invoking the program code stored in the memory, the processor is configured to perform the method in the foregoing embodiments shown in FIG. 3 to FIG. 7.

An embodiment of a network device in the embodiments of this application includes: an input apparatus, an output apparatus, a processor, and a memory (the network device may have one or more processors). In some embodiments of this application, the input apparatus, the output apparatus, the processor, and the memory may be connected through a bus or in another manner. The memory stores program code, and by invoking the program code stored in the memory, the processor is configured to perform the method in the foregoing embodiments shown in FIG. 3 to FIG. 7.

It may be clearly understood by persons skilled in the art that, for ease and brevity of description, for detailed working processes of the foregoing described system, apparatus, and unit, reference may be made to corresponding processes in the foregoing method embodiments, and details are not described herein again.

In the several embodiments provided in this application, it should be understood that the disclosed system, apparatus, and method may be implemented in other manners. For example, the described apparatus embodiments are merely examples. For example, the unit division is merely logical function division and may be other division in actual implementation. For example, a plurality of units or components may be combined or may be integrated into another system, or some features may be ignored or not be performed. In addition, the displayed or discussed mutual couplings or direct couplings or communications connections may be implemented by using some interfaces. The indirect couplings or communications connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer readable storage medium. Based on such an understanding, the technical solutions of this application essentially, or the part contributing to the prior art, or all or some of the technical solutions may be implemented in a form of a software product. The computer software product is stored in a storage medium and includes several instructions for instructing a computer device (which may be a personal computer, a server, a network device, or the like) to perform all or some of the steps of the methods described in the embodiments of this application. The foregoing storage medium includes any medium that can store program code, such as a USB flash drive, a removable hard disk, a read-only memory (ROM, Read-Only Memory), a random access memory (RAM, Random Access Memory), a magnetic disk, or a compact disc.

The foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of this application.

What is claimed is:

1. A resource reservation method, comprising:
receiving, by a controller, a resource reservation request that is of a communication session and that is sent by a sending device, wherein the resource reservation request carries resource requirement information;
obtaining, by the controller based on the resource reservation request, identification information of a network device through which data transmission of the communication session to be performed between the sending device and a receiving device passes, and a resource index of the network device, wherein the resource index identifies a corresponding resource and is used for establishing a mapping relationship with the resource;
sending, by the controller, the resource requirement information and the resource index to the network device based on the identification information, wherein the resource requirement information and the resource index are used to instruct the network device to configure a resource for the communication session; and
sending, by the controller, the identification information and the resource index to the sending device.

2. The method according to claim 1, wherein the sending, by the controller, the identification information and the resource index to the sending device comprises:

receiving, by the controller, a response message that is fed back by the network device after the network device completes resource reservation based on the resource requirement information and the resource index; and sending, by the controller, the identification information and the resource index to the sending device based on the response message.

3. The method according to claim 1, wherein the resource reservation request further carries a destination address corresponding to the receiving device, and wherein the obtaining, by the controller based on the resource reservation request, identification information of a network device through which data transmission of the communication session to be performed between the sending device and a receiving device passes, and a resource index of the network device comprises:

obtaining, by the controller, the identification information and the resource index based on the resource requirement information and the destination address.

4. The method according to claim 3, wherein the obtaining, by the controller, the identification information and the resource index based on the resource requirement information and the destination address comprises:

obtaining, by the controller, an idle resource of the network device by accessing resources of all network devices maintained by the controller;

obtaining, by the controller, the identification information based on the resource requirement information, the destination address, and the idle resource; and allocating, by the controller, the resource index to the communication session.

5. The method according to claim 4, wherein the obtaining, by the controller, the identification information based on the resource requirement information, the destination address, and the idle resource comprises:

obtaining, by the controller from a network, a path that meets the resource requirement information, the destination address, and the idle resource;

obtaining, by the controller from the path, a shortest path that is to be taken for the data transmission to be performed between the sending device and the receiving device; and determining, by the controller, the identification information based on the shortest path.

6. The method according to claim 1, wherein the sending, by the controller, the identification information and the resource index to the sending device comprises:

adding, by the controller, the identification information and the resource index to a signaling packet; and sending, by the controller, the signaling packet that carries the identification information and the resource index to the sending device.

7. The method according to claim 1, wherein the resource index comprises a leaky bucket index or a queue index.

8. The method according to claim 1, wherein the resource requirement information comprises at least one of a bandwidth resource, a burst size, a maximum delay, a maximum delay variation, or a packet loss rate.

9. A resource reservation method, comprising:

sending, by a sending device, a resource reservation request of a communication session to a controller;

receiving, by the sending device, feedback information that is fed back by the controller based on the resource reservation request, wherein the feedback information carries identification information of a network device through which data transmission of the communication session passes, and a resource index of the network device, wherein the resource index identifies a corresponding resource and is used for establishing a mapping relationship with the resource;

adding, by the sending device, the identification information and the resource index to data of the communication session; and sending, by the sending device, the data to a receiving device through the network device.

10. The method according to claim 9, wherein before the adding, by the sending device, the identification information and the resource index to data of the communication session, the method further comprises:

obtaining, by the sending device, a session identifier of the communication session;

storing, by the sending device, the identification information and the resource index after associating the identification information and the resource index with the session identifier; and wherein the adding, by the sending device, the identification information and the resource index to data of the communication session comprises:

obtaining, by the sending device, the stored identification information and resource index based on the session identifier; and adding, by the sending device, the identification information and the resource index to the data.

11. The method according to claim 9, wherein a type of the data comprises internet protocol version 6 (IPv6), internet protocol version 4 (IPv4), or multiprotocol label switching (MPLS).

12. The method according to claim 11, wherein the adding, by the sending device, the identification information and the resource index to data of the communication session comprises:

adding, by the sending device, the identification information and the resource index to an IPv6 header, an IPv4 header, or an MPLS header.

13. A resource reservation method, comprising:

receiving, by a network device, resource requirement information of a communication session and a resource index that are sent by a controller, wherein the resource index identifies a corresponding resource and is used for establishing a mapping relationship with the resource;

configuring, by the network device, a resource for the communication session based on the resource requirement information and the resource index, wherein the resource corresponds to the resource index;

receiving, by the network device, data that is of the communication session and that is sent by a sending device, wherein the data carries a target resource index corresponding to the network device and target identification information corresponding to a next hop relative to the network device, wherein the target resource index is comprised in the resource index, and wherein the target identification information is comprised in identification information of a network device through which data transmission of the communication session passes; and forwarding, by the network device, the data based on the target resource index and the target identification information.

14. The method according to claim 13, wherein after the configuring, by the network device, a resource for the communication session based on the resource requirement information and the resource index, the method further comprises:
- feeding back, by the network device, a response message to the controller after completing configuration of the resource.

16. The method according to claim 13, wherein the forwarding, by the network device, the data based on the target resource index and the target identification information comprises:
- obtaining, by the network device from the data and based on an offset corresponding to the network device, the target resource index corresponding to the network device and the target identification information corresponding to the next hop relative to the network device;
- obtaining, by the network device, an output interface corresponding to the target identification information;
- obtaining, by the network device, a resource corresponding to the target resource index; and
- sending, by the network device, the data to the next hop relative to the network device by using the output interface and the resource until a next hop is a receiving device.

15. The method according to claim 13, wherein the forwarding, by the network device, the data based on the target resource index and the target identification information comprises:
- obtaining, by the network device from a first instruction section of the data, the target resource index corresponding to the network device and the target identification information corresponding to the next hop relative to the network device;
- obtaining, by the network device, an output interface corresponding to the target identification information;
- deleting, by the network device, the target identification information;
- obtaining, by the network device, a resource corresponding to the target resource index;
- deleting, by the network device, the target resource index; and
- sending, by the network device, the data to the next hop relative to the network device by using the output interface and the resource until a next hop is a receiving device.

17. The method according to claim 13, wherein the resource index comprises a leaky bucket index or a queue index.

18. The method according to claim 13, wherein the resource requirement information comprises at least one of a bandwidth resource, a burst size, a maximum delay, a maximum delay variation, or a packet loss rate.

* * * * *